US007666138B2

(12) United States Patent
Ogawa

(10) Patent No.: US 7,666,138 B2
(45) Date of Patent: *Feb. 23, 2010

(54) ULTRASONIC TRANSMITTING AND RECEIVING APPARATUS AND ULTRASONIC TRANSMITTING AND RECEIVING METHOD

(75) Inventor: Eiji Ogawa, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 977 days.

This patent is subject to a terminal disclaimer.

(21) Appl. No.: 10/803,876

(22) Filed: Mar. 19, 2004

(65) Prior Publication Data

US 2004/0193052 A1    Sep. 30, 2004

(30) Foreign Application Priority Data

Mar. 24, 2003    (JP)    ............................. 2003-081316

(51) Int. Cl.
*A61B 8/00*    (2006.01)
(52) U.S. Cl. ...................... 600/442; 600/437; 600/438; 600/447
(58) Field of Classification Search ................ 600/437, 600/440, 443, 447
See application file for complete search history.

(56) References Cited

U.S. PATENT DOCUMENTS

| | | | | |
|---|---|---|---|---|
| 5,105,814 A | * | 4/1992 | Drukarev et al. | 600/443 |
| 5,523,058 A | * | 6/1996 | Umemura et al. | 422/128 |
| 5,553,618 A | * | 9/1996 | Suzuki et al. | 600/411 |
| 5,856,955 A | * | 1/1999 | Cole et al. | 367/138 |
| 5,976,089 A | * | 11/1999 | Clark | 600/447 |
| 6,016,285 A | * | 1/2000 | Wright et al. | 367/11 |
| 6,110,116 A | * | 8/2000 | Wright et al. | 600/447 |
| 6,179,780 B1 | | 1/2001 | Hossack et al. | |
| 6,910,380 B2 | * | 6/2005 | Ogawa | 73/628 |
| 2003/0212326 A1 | * | 11/2003 | Ebbini et al. | 600/437 |
| 2005/0033167 A1 | * | 2/2005 | Trucco et al. | 600/437 |

FOREIGN PATENT DOCUMENTS

| | | |
|---|---|---|
| EP | 0 684 486 A | 11/1995 |
| EP | 1 103 950 A | 5/2001 |
| JP | 56-136537 A | 10/1981 |
| JP | 57-112850 A | 7/1982 |
| JP | 04-244145 A | 9/1992 |
| JP | 09-161041 A | 6/1997 |

* cited by examiner

*Primary Examiner*—Long V Le
*Assistant Examiner*—Ellsworth Weatherby
(74) *Attorney, Agent, or Firm*—Sughrue Mion, PLLC

(57) ABSTRACT

An ultrasonic transmitting and receiving apparatus capable of obtaining high quality ultrasonic images with reduced effect of side lobes. The apparatus includes: an ultrasonic transducer array including ultrasonic transducers; a drive signal generating unit for generating drive signals for driving the ultrasonic transducers; a transmission control unit for controlling the drive signal generating unit such that ultrasonic waves transmitted from the ultrasonic transducers form at least one ultrasonic beam; a reception control unit for performing reception focusing processing on detection signals obtained based on the ultrasonic echoes to form a reception focal point thereby obtaining plural pieces of measurement data; a storage unit for storing plural different acoustic pressure intensity profiles; and an essential data calculating unit for calculating image data based on the plural pieces of measurement data and the plural different acoustic pressure intensity profiles.

17 Claims, 15 Drawing Sheets

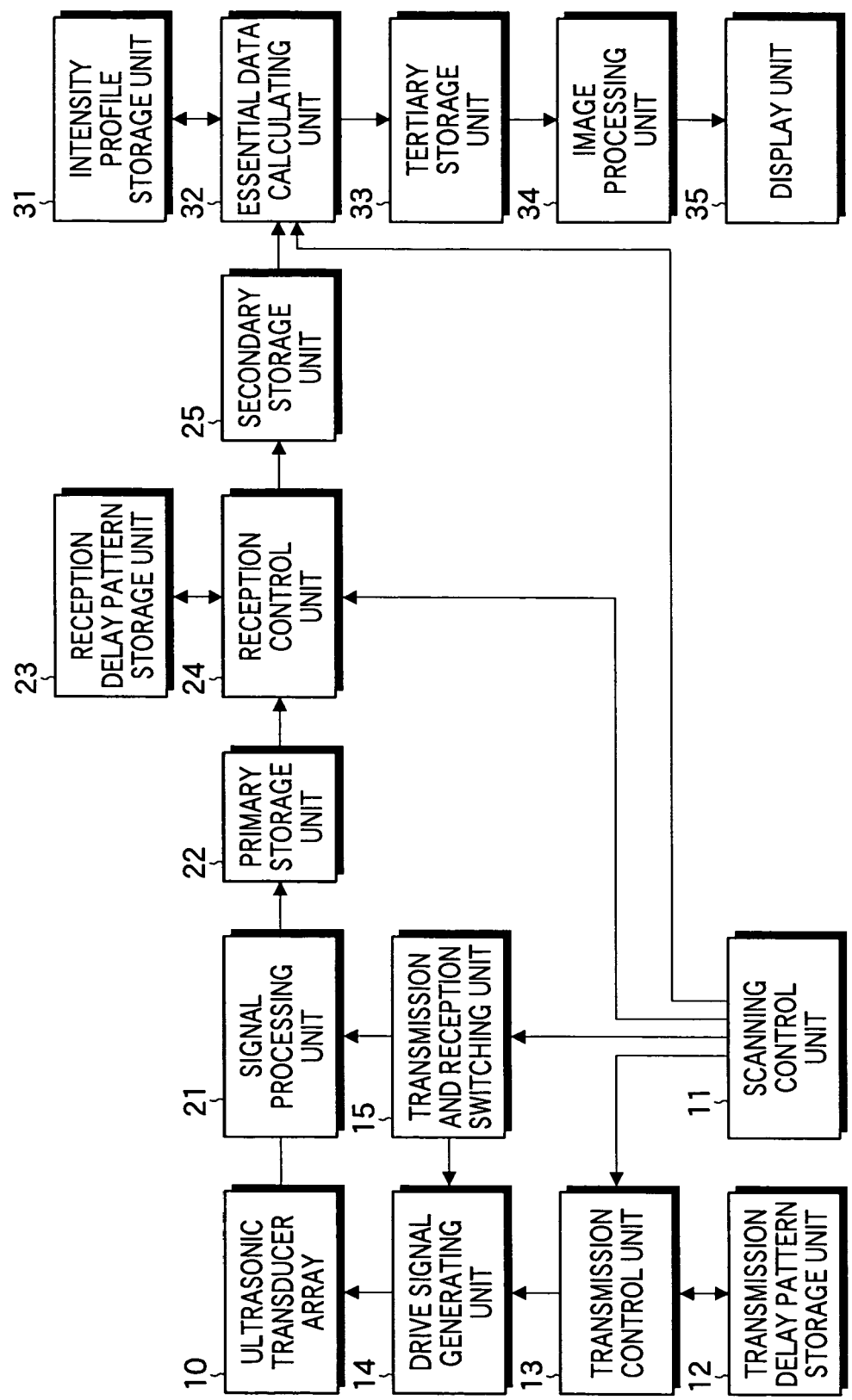

ULTRASONIC TRANSMITTING AND RECEIVING APPARATUS AND ULTRASONIC TRANSMITTING AND RECEIVING METHOD

BACKGROUND OF THE INVENTION

1. Field of the Invention

The present invention relates to an ultrasonic transmitting and receiving apparatus and an ultrasonic transmitting and receiving method to be used for obtaining ultrasonic images by transmitting ultrasonic waves and receiving ultrasonic echoes.

2. Description of a Related Art

Conventionally, in order to obtain a two-dimensional or three-dimensional image, for example, like B-mode scanning, ultrasonic beams are transmitted one by one to scan an object to be inspected, and a two-dimensional or three-dimensional image is synthesized based on the obtained image information. However, according to such method, since time lag between frames is large, images in different times are synthesized and the synthesized image is blurred when imaging moving parts. Especially, when observing a part moving hard such as a circulatory organ, real time operation of at least 30 frames per second is required. In order to obtain ultrasonic images in real time, the imaging region within the object must be scanned at high speed, and the method of sequential scanning with a single ultrasonic beam is too late for the requirement.

As a countermeasure against such problem, a technology of transmitting and receiving plural ultrasonic beams simultaneously toward many directions from an ultrasonic transducer array in which plural ultrasonic transducers are arranged two-dimensionally is under study.

FIG. 15A schematically shows a state in which ultrasonic beams are transmitted from an ultrasonic transducer array included in an ultrasonic probe that is generally used. An ultrasonic transducer array 100 is fabricated by, for example, linearly arranging a number of ultrasonic transducers 101. As an element (ultrasonic transducer) used for transmission and reception of ultrasonic waves, an element in which electrodes are formed on both ends of a material having a piezoelectric property (piezoelectric element) that includes piezoelectric ceramic represented by PZT (Pb (lead) zirconate titanate) or a macromolecule piezoelectric element represented by PVDF (polyvinylidene difluoride) has been generally used.

Drive signal generating circuits including pulsers etc. are connected to these ultrasonic transducers 101, respectively. Applying a voltage to such ultrasonic transducer 101, the piezoelectric element expands and contracts by piezoelectric effect to generate ultrasonic waves. By driving plural ultrasonic transducers 101 at predetermined time intervals, spherical waves transmitted from the respective ultrasonic transducers 101 are synthesized and the ultrasonic beam having a focal point formed in a desired direction and a desired depth can be transmitted.

In addition, as shown in FIG. 15B, by applying two sets of timing pulses of A pulse and B pulse to one set of elements, an ultrasonic beam A and an ultrasonic beam B can be transmitted simultaneously in different directions. Note that, in the case where the A pulse and B pulse overlap, a common pulse as an addition result may be generated.

Hereinafter, thus simultaneously transmitted and received plural ultrasonic beams are referred to as "multi-beam".

Now, in ultrasonic imaging, side lobes produced when transmitting ultrasonic beams become problematic. When an ultrasonic beam having directivity is transmitted, in spatial distribution of acoustic pressure intensity, a local maximum that occurs on the center axis in a transmitting direction is referred to as "main lobe", and a local maximum that occurs in a direction other than that is referred to as "side lobe". The side lobe is produced depending on the relationship between the element pitch of the ultrasonic transducers and ultrasonic frequency (such side lobe is referred to as "grating lobe"), or produced by the unwanted vibration of the ultrasonic transducers. Normally, an ultrasonic echo received by the ultrasonic transducer is subjected to signal processing as an echo that has propagated from the direction of the main lobe. On this account, in the case where the side lobe component is large or there is a strong reflector in the side lobe direction, an artifact (virtual image) is generated, and the image quality of the ultrasonic image is degraded.

In order to avoid such phenomenon, measures have been taken for suppressing the side lobes, such as improvement in the delay accuracy of the transmitted and reception beams and miniaturization of the element. However, there are limits to these techniques, and the side lobes have not been reduced to the sufficient level. Further, in the case where the ultrasonic beam is largely steered, or ultrasonic waves are subjected to multi-beam transmission, the level of the side lobe component becomes higher, and accordingly, it becomes more difficult to reduce it. Therefore, the effect on the image quality becomes a major problem.

U.S. Pat. No. 6,179,780 discloses the following technology for reducing the effect by the side lobes when performing multi-beam transmission and reception of ultrasonic waves. That is, a method of forming plural reception beams for one transmission beam, or a method of identifying transmission beams by changing frequencies of plural transmission beams or coding transmission beams by using Barker code, Golay code, etc. to relate them with received ultrasonic echoes are cited. Further, since there is a region called as "null line" where the acoustic pressure becomes generally zero between a main lobe and a side lobe, a method of performing alignment of the main lobe of another ultrasonic beam in the region, a method of simply separating the intervals of transmission beams, and a method of shifting the center frequencies of the transmission beams are also cited. Although these methods are for suppressing the occurrence of the side lobes, there is a limit to the degree that the side lobes can be reduced.

By the way, recently, as one of greatly developed technologies in the medical imaging technology field, X-ray CT (computed tomography) can be cited. The X-ray CT is a technology of applying X-rays from plural directions to the object and generating the tomogram of the object based on the X-rays transmitted through the object. However, since X-ray signals transmitted through the object from different hundreds of directions are required in order to obtain an X-ray CT image with high image quality, a complex and accurate mechanism for rotating the X-ray source and X-ray detecting unit, a huge amount of time and a high performance data processing unit for processing an enormous amount of data, etc. are indispensable. Accordingly, the apparatus becomes large scaled and expensive, and that has discouraged the widespread in general use. Further, the exposed dose of the X-ray applied to an object to be inspected has been also problematic.

In order to solve such problems, Japanese Patent Application Publication JP-A-9-161041 discloses a CT apparatus capable of obtaining high quality images at high speed even if the number of projection directions is small. In this CT apparatus, a generalized inverse matrix is stored which has been calculated in advance by performing singular value decomposition on the projection model matrix expressing in a matrix the relationship between predetermined plural different transmission paths and influence coefficients as the degree of effect on the projection value by respective pixels within a calculation space partitioned in a lattice form when a transmission ray passes through respective transmission paths, and then, the data for image display is generated by using the projection values on intersections of the X-rays projected from different directions (the partitioned calculation space in a lattice form) and the generalized inverse matrix.

However, this technique is for estimating the signals on the lattice points, where these transmission paths intersect, from the projection values in the different plural transmission paths (integration values of the transmission paths), and such technology can not be directly applied to the ultrasonic imaging for obtaining information on the object from the acoustic pressure intensity of the ultrasonic echoes reflected from the object.

SUMMARY OF THE INVENTION

The present invention has been achieved in view of the above-described problems. An object of the present invention is to provide an ultrasonic transmitting and receiving apparatus and an ultrasonic transmitting and receiving method capable of obtaining high image quality ultrasonic images with reduced effect of side lobes.

In order to solve the above-described problems, an ultrasonic transmitting and receiving apparatus according to the present invention comprises: an ultrasonic transducer array including plural ultrasonic transducers for transmitting ultrasonic waves and receiving ultrasonic echoes reflected from an object to be inspected; drive signal generating means for generating drive signals for respectively driving the plural ultrasonic transducers; transmission control means for controlling the drive signal generating means such that ultrasonic waves transmitted from the plural ultrasonic transducers form at least one ultrasonic beam; signal processing means for performing reception focusing processing on plural detection signals obtained based on the ultrasonic echoes received by the plural ultrasonic transducers so as to form a reception focal point in at least one region within the object thereby obtaining plural detection signals relating to the at least one region; storage means for storing plural different acoustic pressure intensity profiles set based on acoustic pressure intensity distribution formed by transmitting ultrasonic beams and the reception focusing processing to be performed in the signal processing means; and calculating means for calculating image data relating to the at least one region on the basis of the plural detection signals relating to the at least one region and the plural different acoustic pressure intensity profiles.

Here, the signal processing means may obtain plural detection signals respectively relating to plural regions within the object, and the calculating means may calculate image data relating to the plural regions by using the plural detection signals and plural different acoustic pressure intensity profiles relating to the plural regions. Further, the signal processing means may obtain plural detection signals relating to one region within the object, and the calculating means may calculate image data relating to the one region by using the plural detection signals and plural different acoustic pressure intensity profiles relating to the one region. Furthermore, the signal processing means may obtain plural detection signals relating to each of plural regions within the object, and the calculating means may calculate image data relating to the plural regions by using the plural detection signals and the plural different acoustic pressure intensity profiles relating to the plural regions.

An ultrasonic transmitting and receiving method according to the present invention is an ultrasonic transmitting and receiving method of transmitting and receiving ultrasonic waves using an ultrasonic transducer array including plural ultrasonic transducers for transmitting ultrasonic waves and receiving ultrasonic echoes reflected from an object to be inspected, and the method comprises the steps of: (a) transmitting at least one ultrasonic beam by driving the plural ultrasonic transducers, respectively; (b) obtaining plural detection signals relating to the at least one region within the object by performing reception focusing processing on the plural detection signals obtained based on the ultrasonic echoes received by the plural ultrasonic transducers so as to form a reception focal point in the at least one region; (c) calculating image data relating to at least one region based on plural different acoustic pressure intensity profiles set based on acoustic pressure intensity distribution formed by transmitting ultrasonic beams and the reception focusing processing performed at step (b) and the plural detection signals relating to the at least one region.

According to the present invention, since ultrasonic echo signals with no side lobe are estimated based on the acoustic pressure intensity profiles and the detection signals, high quality ultrasonic images with reduced effect of side lobes can be obtained.

BRIEF DESCRIPTION OF THE DRAWINGS

FIG. 1 is a block diagram showing a constitution of an ultrasonic transmitting and receiving apparatus according to the first embodiment of the present invention;

DESCRIPTION OF THE PREFERRED EMBODIMENTS

Figure 2A:
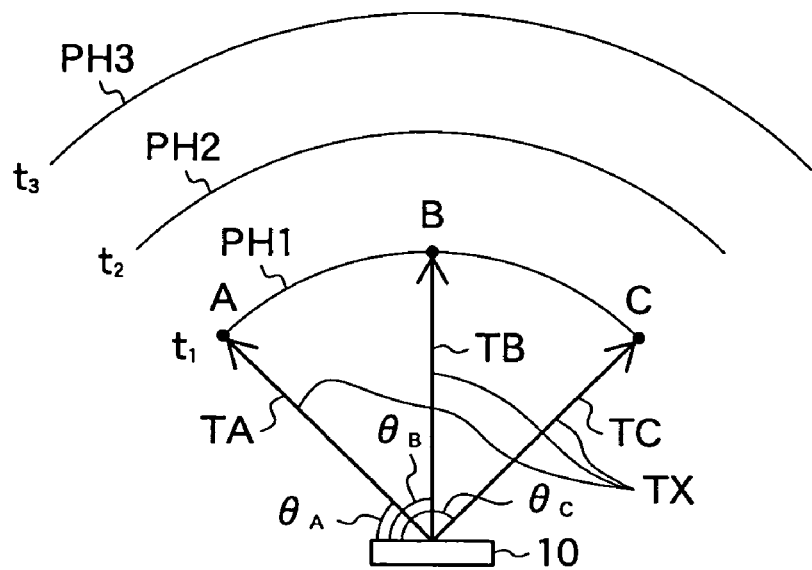
FIG. 2A is a schematic diagram showing a state in which plural ultrasonic beams are transmitted from an ultrasonic transducer.

Hereinafter, embodiments of the present invention will be described in detail by referring to the drawings. The same component elements are assigned with the same reference numerals and the descriptions thereof will be omitted.

FIG. 1 is a block diagram showing a constitution of an ultrasonic transmitting and receiving apparatus according to the first embodiment of the present invention.

The ultrasonic transmitting and receiving apparatus according to this embodiment includes an ultrasonic transducer array 10. The ultrasonic transducer array 10 includes plural ultrasonic transducers arranged in a matrix form, for example. The ultrasonic transducer array 10 transmits ultrasonic beams based on driving signals applied thereto, and receives propagating ultrasonic waves to output detection signals. Each ultrasonic transducer is constituted by a vibrator in which electrodes are formed on both ends of a material having a piezoelectric property (piezoelectric element) that includes piezoelectric ceramic represented by PZT (Pb (lead) zirconate titanate) or a macromolecule piezoelectric element represented by PVDF (polyvinylidene difluoride), for example. Applying a voltage of a pulsed electrical signal or continuous wave electrical signal to the electrodes of such vibrator, the piezoelectric element expands and contracts. By the expansion and contraction, pulsed or continuous ultrasonic waves are generated from respective vibrators, and these ultrasonic waves are synthesized to form an ultrasonic beam. Further, the vibrators expand and contract by receiving propagating ultrasonic waves and generate electrical signals. These electrical signals are outputted as detection signals of ultrasonic waves.

Alternatively, as the ultrasonic transducers, plural kinds of elements according to different ultrasonic conversion methods may be used. For example, the above-described vibrator is used as an element for transmitting ultrasonic waves, and a photo-detection type ultrasonic transducer is used as an element for receiving ultrasonic waves. The photo-detection type ultrasonic transducer is for detecting an ultrasonic signal by converting it into an optical signal, and, for example, constituted by a Fabry-Perot resonator or fiber Bragg grating.

Further, the ultrasonic transmitting and receiving apparatus includes a scanning control unit 11, a transmission delay pattern storage unit 12, a transmission control unit 13, a drive signal generating unit 14, and a transmission and reception switching unit 15. The scanning control unit 11 sequentially sets transmitting directions of ultrasonic beams and receiving directions of ultrasonic echoes. The transmission delay pattern storage unit 12 has stored plural transmission delay patterns to be used when the ultrasonic beams are formed. The transmission control unit 13 selects a transmission delay pattern from among plural transmission delay patterns stored in the transmission delay pattern storage unit 12 according to the transmitting directions set in the scanning control unit 11, and sets the delay times to be respectively provided to the plural ultrasonic transducers on the basis of the selected transmission delay pattern.

The drive signal generating unit 14 is constituted by, for example, plural pulsers corresponding to the plural ultrasonic transducers. Each of the plural pulsers generates a drive signal based on the delay time set in the transmission control unit 13. The transmission and reception switching unit 15 switches the generation of drive signals in the drive signal generating unit 14 and capture of the detection signals in a signal processing unit 21 at timing according to the control of the scanning control unit 11. By restricting the time periods for reading detection signals as described above, echo signals reflected from a particular depth of the object can be detected.

Further, the ultrasonic transmitting and receiving apparatus includes the signal processing unit 21, a primary storage unit 22, a reception delay pattern storage unit 23, a reception control unit 24, a secondary storage unit 25, an intensity profile storage unit 31, an essential data calculating unit 32, a tertiary storage unit 33, an image processing unit 34, and a display unit 35.

The signal processing unit 21 includes plural channels corresponding to the plural ultrasonic transducers. Each of the plural channels of the signal processing unit 21 captures the detection signal outputted from the corresponding ultrasonic transducer with predetermined timing, and performs signal processing such as logarithmic amplification, demodulation, STC (sensitivity time control), filtering processing, A/D conversion. The primary storage unit 22 stores detection signals subjected to signal processing in the signal processing unit 21 with respect to each channel in chronological order.

The reception delay pattern storage unit 23 has stored plural reception delay patterns to be used when reception focusing processing is performed on the plural detection signals outputted from the plural ultrasonic transducers. The reception control unit 24 selects a reception delay pattern from plural reception delay patterns stored in the reception delay pattern storage unit 23 according to the reception direction set in the scanning control unit 11, and performs reception focusing processing by providing delays to the plural detection signals based on the reception delay pattern and adding them to each other. By the reception focusing processing, sound ray data in which the focal point of the ultrasonic echo is narrowed down is formed. The secondary storage unit 25 stores the sound ray data formed in the reception control unit 24.

The intensity profile storage unit 31 has stored plural different acoustic pressure intensity profiles, which will be also simply referred to as "intensity profiles" or "profiles". The intensity profiles represent acoustic pressure intensity or acoustic pressure intensity ratios in plural regions included in the surface where the ultrasonic beams reach in a predetermined time elapsed from being transmitted.

Hereinafter, the surface where the ultrasonic beams reach in predetermined time elapsed from being transmitted is referred to as "isochronal surface". It is conceivable that, in plural regions included in one isochronal surface, distances from the transmitting position of the ultrasonic beam are substantially equal. The intensity profiles are expressed by the function of the positions (directions) of the plural regions included in the isochronal surface and the acoustic pressure intensity or acoustic pressure intensity ratios therein.

It is assumed that, in the space in which ultrasonic waves are transmitted and received, spatial distribution of acoustic pressure intensity (acoustic field) is formed by the acoustic pressure intensity distribution formed by transmitting ultrasonic beams and the reception focusing processing performed in the reception control unit 24. In this embodiment, such spatial distribution of acoustic pressure intensity is utilized in order to eliminate the effect of side lobes in the detection signals.

The plural intensity profiles stored in the intensity profile storage unit 31 are set based on (i) the transmitting directions of ultrasonic beams and (ii) the reception focusing processing of ultrasonic echoes, that is, receiving directions and depths of the reception focal points. Further, as factors for setting the acoustic pressure intensity profile, a number of used elements from among the elements included in the ultrasonic transducer array 10, an element pitch, an aperture diameter of the used elements, or aperture conditions including a weighting factor within the aperture may be included. Such intensity profile can be obtained by simulating an acoustic field based on the above-described aperture conditions, transmission conditions including the transmission delay pattern, and reception conditions including the reception delay pattern. On the other hand, the intensity profile may be obtained by transmitting and receiving ultrasonic beams to the scattering phantom based on these conditions and using intensity ratio of ultrasonic echoes obtained by the measurement.

The essential data calculating unit 32 selects a profile from the plural profiles stored in the intensity profile storage unit 31 based on the transmitting direction and receiving direction set in the scanning control unit 11, and calculates image data with the suppressed side lobe components (essential data) based on the profile and measurement data corresponding to a selected isochronal surface from among the sound data stored in the secondary storage unit 25. The tertiary storage unit 33 stores the image data calculated in the essential data calculating unit 32.

The image processing unit 34 constructs two-dimensional or three-dimensional image data based on the image data stored in the tertiary storage unit 33, and performs image processing such as gain adjustment, contrast adjustment, gradation processing, response enhancement processing, interpolation processing, etc. and further performs scanning conversion on the image data. The display unit 35 displays ultrasonic images based on the image data processed in the image processing unit 34. The display unit 35 includes a display device such as a CRT or an LCD, for example.

Next, the principle of the ultrasonic transmission and reception in this embodiment will be described by referring to FIGS. 2A to 4.

Figure 2B:
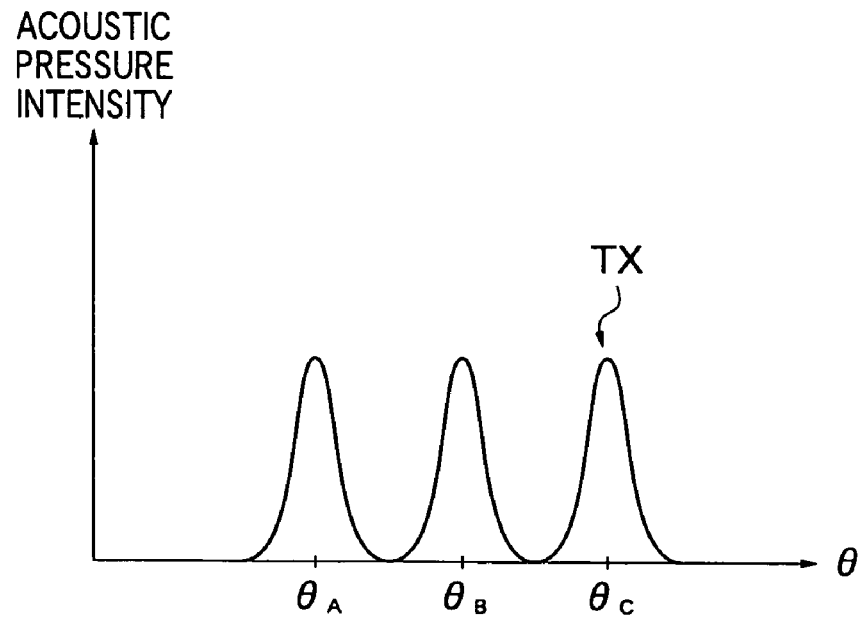
FIG. 2B shows the profiles of transmission beams formed within the object by transmitting plural ultrasonic beams.

As shown in FIG. 2A, acquisition of essential data $x_A$, $x_B$, $x_C$ relating to regions A, B, C on the isochronal surface PH1 in TA direction, TB direction, TC direction will be discussed. Here, the isochronal surfaces PH1, PH2, PH3 are surfaces where the ultrasonic beams reach in time periods t1, t2, t3 from being transmitted, respectively. In addition, the essential data is ideal data representing information on the respective regions, in which the effect by the side lobe component is reduced. When ultrasonic beams are subjected to multi-beam transmission towards these three directions, at least three lobes (local maximums) occur in the acoustic field. Accordingly, the transmission beams are formed and transmitted so that strong lobes may be produced in TA direction, TB direction, TC direction shown in FIG. 2A. In order to form desired transmission beams, a number of elements to be used from among the elements included in the ultrasonic transducer array 10, the element pitch, the aperture condition including an aperture diameter of the element to be used and weighting within the aperture, and the transmission condition including the transmission delay pattern may be used. Thereby, the acoustic field having the transmission beam profile as shown in FIG. 2B is formed in the space within the object.

Figure 3A:
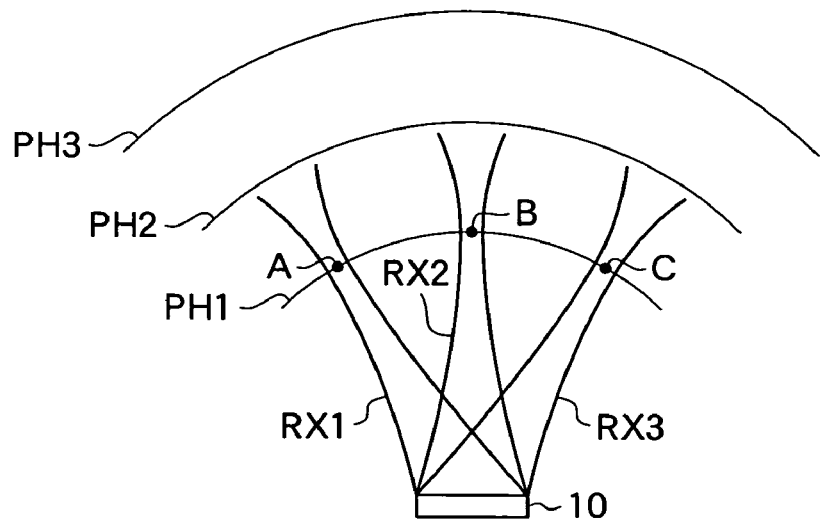
FIG. 3A is a schematic diagram showing plural reception beams having reception focal points formed therein.
Figure 3B:
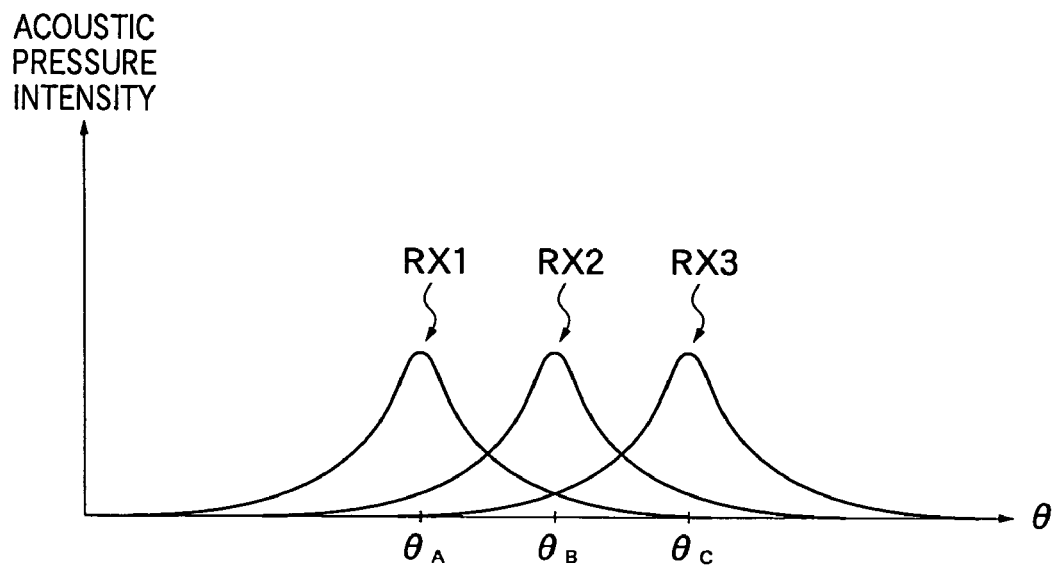
FIG. 3B shows profiles of the reception beams.

On the other hand, as shown in FIG. 3A, when ultrasonic echoes are received, reception focusing processing is performed on the detection signals so that reception focal points may be formed in a predetermined depth (for example, isochronal surface PH1) in the respective directions. FIG. 3B shows profiles of reception beams RX1, RX2, RX3 obtained by performing reception focusing processing with respect to each of TA direction, TB direction, TC direction.

Figure 4:
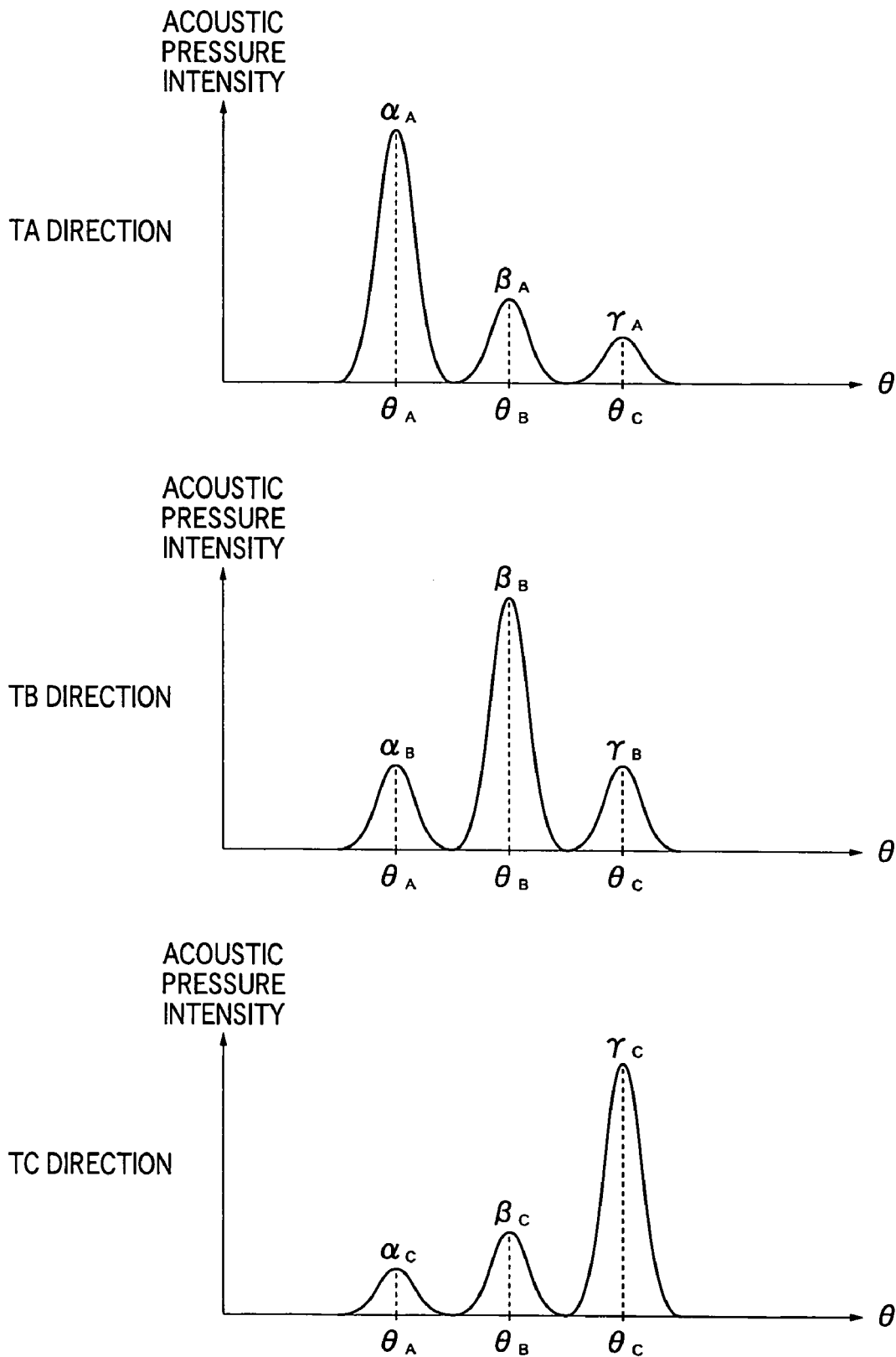
FIG. 4 shows acoustic pressure intensity profiles obtained based on the profiles of the transmission beams and the profiles of the reception beams.

Accordingly, as shown in FIG. 4, intensity profiles obtained by actually transmitting ultrasonic beams and performing reception focusing on the received echoes are multiplication of the transmission beam profiles and reception beam profiles. In FIG. 4, $\alpha_A$, $\beta_A$, $\gamma_A$ represent acoustic pressure intensity ratios corresponding to three lobes determined by the transmission beam TX and the reception beam RX1. Similarly, $\alpha_B$, $\beta_B$, $\gamma_B$ or $\alpha_C$, $\beta_C$, $\gamma_C$ represent acoustic pressure intensity ratios corresponding three lobes determined by the transmission beam TX and the reception beam RX2 or RX3.

As shown in FIG. 4, even when the reception focusing processing is performed toward the predetermined direction, signal components from different directions are mixed in the measurement data obtained based on the actually received ultrasonic echoes. For example, the measurement data $y_A$ obtained based on the ultrasonic echoes received after time period $t_1 \times 2$ from the transmission time includes a part of components of signals $x_B$ and $x_C$ respectively received from TB direction and TC direction other than the essential data $x_A$ representing information on the region A. Accordingly, assuming that the measurement data $y_A$ is obtained by performing weighted addition on the ultrasonic echo signals from these three directions (TA, TB, TC) with the above-described acoustic pressure intensity ratios, the measurement data $y_A$ is expressed by the following equation.

$$y_A = \alpha_A \cdot x_A + \beta_A \cdot x_B + \gamma_A \cdot x_C$$

Similarly, expressing measurement data $y_B$, $y_C$ by using the intensity profiles, the following simultaneous linear equations can be obtained.

$$y_A = \alpha_A \cdot x_A + \beta_A \cdot x_B + \gamma_A \cdot x_C$$

$$y_B = \alpha_B \cdot x_A + \beta_B \cdot x_B + \gamma_B \cdot x_C$$

$$y_C = \alpha_C \cdot x_A + \beta_C \cdot x_B + \gamma_C \cdot x_C \quad (1)$$

Accordingly, by solving the simultaneous equations (1) by using the acoustic pressure intensity ratios $\alpha_A$, $\alpha_B$, ... in the intensity profiles obtained in advance and the measurement data $y_A$, $y_B$, $y_C$, the essential data $x_A$, $x_B$, $x_C$ can be obtained.

Further, by performing such calculation with respect to all of the isochronal surfaces PH1, PH2, ... while varying transmitting directions TA, TB, ... of ultrasonic beams, essential data can be estimated with respect to all of the regions within the space.

As above, the estimation of three essential data is explained by assuming that the ultrasonic beams are transmitted in three directions and the ultrasonic echo components propagating from different directions are mixed with three pieces of measurement data. However, the number of transmission beams, the number of measurement data to be used and the number of estimable essential data are not necessarily required to be the same.

Figure 5A:
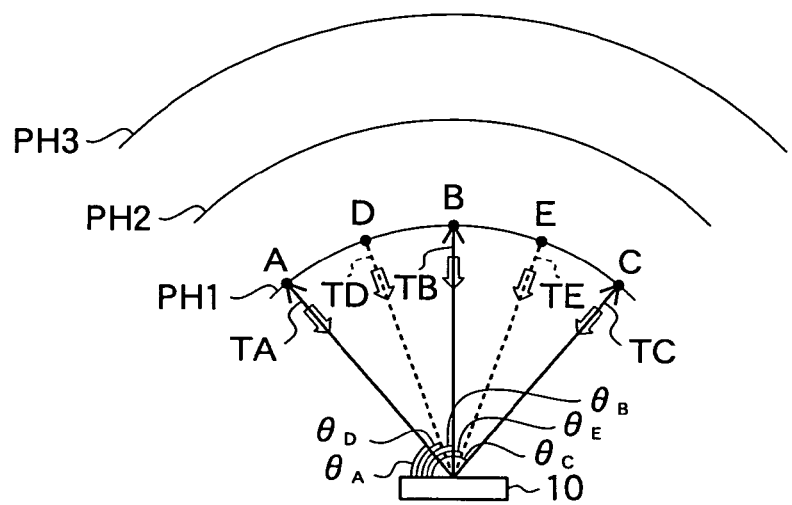
FIGS. 5A and 5B show acoustic pressure intensity profiles obtained by transmitting ultrasonic beams in three directions and performing reception focusing processing with respect to five directions.
Figure 5B:
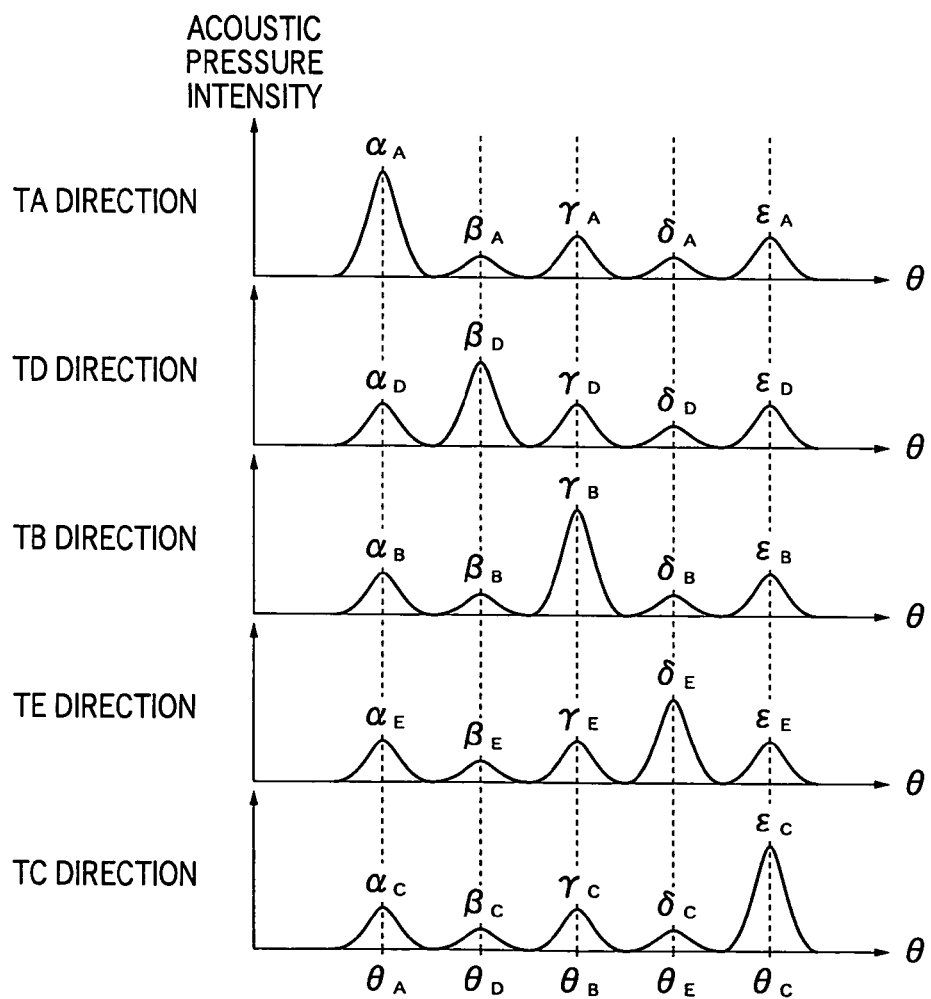

For example, as shown in FIG. 5A, five pieces of measurement data may be acquired by performing multi-beam transmission toward the three directions of TA, TB, TC and performing reception focusing processing with respect to five directions of TA, TB, TC, TD, TE. In this case, as shown in FIG. 5B, five intensity profiles are used. Accordingly, the five pieces of measurement data $y_A$, $y_B$, $y_C$, $y_D$, $y_E$ in the isochronal surface PH1 are expressed by the following equations by using the intensity profiles and essential data $x_A$, $x_B$, $x_C$, $x_D$, $x_E$ in the isochronal surface PH1.

$$y_A = \alpha_A \cdot x_A + \beta_A \cdot x_B + \gamma_A \cdot x_C + \delta_A \cdot x_D + \epsilon_A \cdot x_E$$

$$y_B = \alpha_B \cdot x_A + \beta_B \cdot x_B + \gamma_B \cdot x_C + \delta_B \cdot x_D + \epsilon_B \cdot x_E$$

$$y_C = \alpha_C \cdot x_A + \beta_C \cdot x_B + \gamma_C \cdot x_C + \delta_C \cdot x_D + \epsilon_C \cdot x_E$$

$$y_D = \alpha_D \cdot x_A + \beta_D \cdot x_B + \gamma_D \cdot x_C + \delta_D \cdot x_D + \epsilon_D \cdot x_E$$

$$y_E = \alpha_E \cdot x_A + \beta_E \cdot x_B + \gamma_E \cdot x_C + \delta_E \cdot x_D + \epsilon_E \cdot x_E \quad (2)$$

By solving the simultaneous equations (2), the essential data $x_A$ to $x_E$ can be estimated.

As described above, the estimation accuracy of the essential data can be raised by assuming that larger number of ultrasonic echo components are mixed in the measurement data and increasing the number of equations. For example, even in the case of performing multi-beam transmission in three directions, simultaneous equations may be constructed by assuming that ultrasonic echo components propagating from ten or more directions are mixed therein.

By the way, in the simultaneous equations (1) and (2), since the number of unknowns (essential data) and the number of equations are the same, the unknowns are uniquely determined. However, in the case where at least one data having lower reliability is included in the plural pieces of measurement data, the estimation accuracy of all pieces of the essential data becomes lower. Accordingly, by constructing simultaneous equations so that the number of equations becomes larger than the number of unknowns, the stability of solution can be raised.

Figure 6:
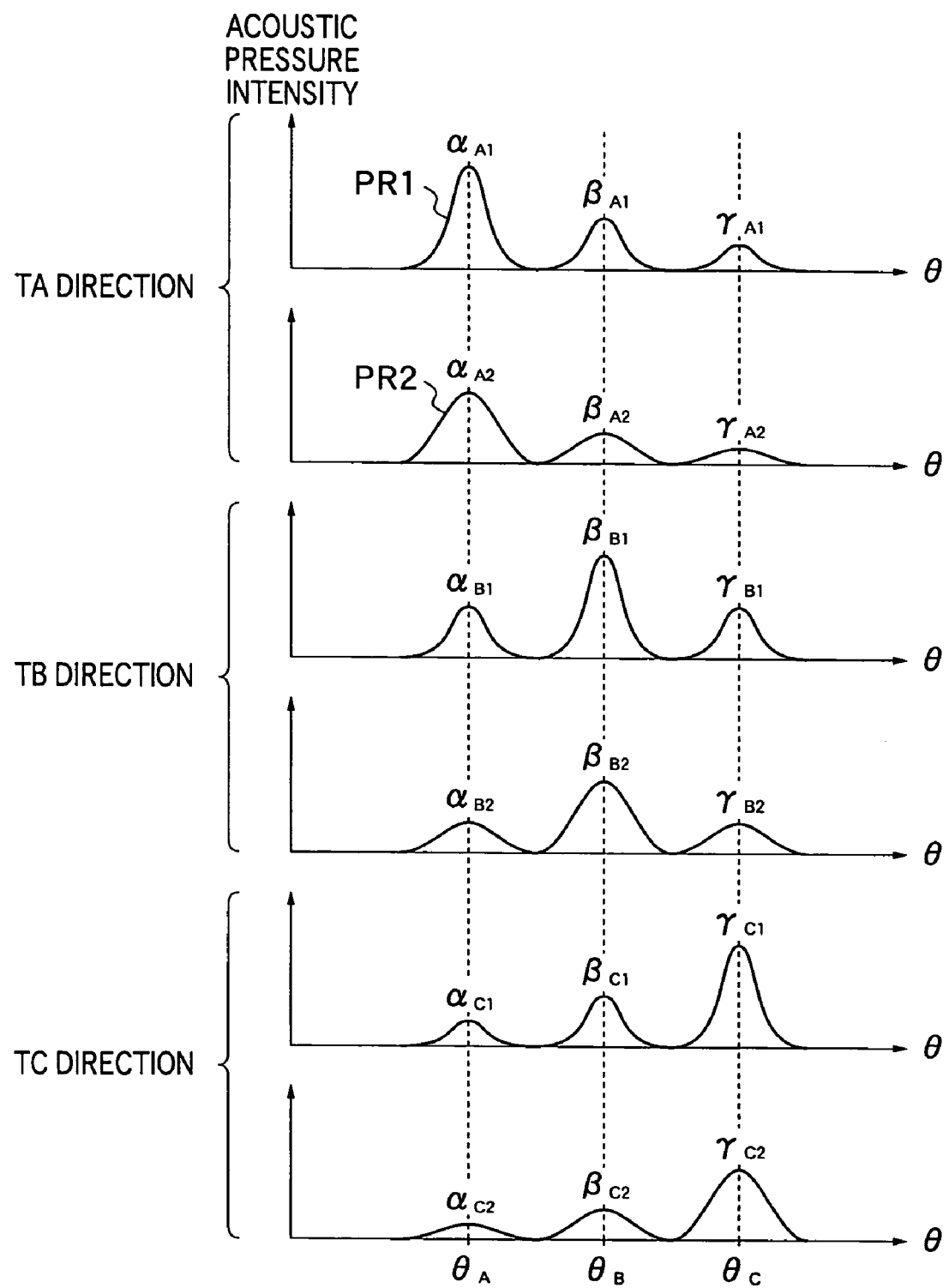
FIG. 6 show acoustic pressure intensity profiles obtained by performing reception focusing processing with respect to each of three regions.

In order to increase the number of equations constituting simultaneous equations, it is necessary to prepare plural pieces of measurement data relating to a predetermined region and plural different intensity profiles corresponding to their acquisition conditions. For that purpose, ultrasonic beams may be transmitted and received by varying one or all of the aperture condition of the ultrasonic transducer array 10, transmission condition or reception condition of the ultrasonic beams. For example, by performing reception focusing processing on a series of detection signals with respect to the region A in the isochronal surface PH1 in TA direction, which is shown in FIG. 2, by using different two kinds of reception delay patterns, two kinds of measurement data $y_{A1}$ and $y_{A2}$ can be obtained. This is possible by setting reception focusing while varying the focal depth, for example. In addition, as shown in FIG. 6, two intensity profiles PR1 (acoustic pressure intensity ratios $\alpha_{A1}$, $\beta_{A1}$, $\gamma_{A1}$) and PR2 (acoustic pressure intensity ratios $\alpha_{A2}$, $\beta_{A2}$, $\gamma_{A2}$) corresponding to the two kinds of reception delay patterns can be obtained. Similarly, plural pieces of measurement data and plural intensity profiles are also obtained with respect to each of TB direction and TC direction. By expressing these pieces of measurement data by using essential data $x_A$, $x_B$, $x_C$ relating to the regions A, B, C and the intensity profiles, simultaneous equations (3) constituted by six equations can be constructed with respect to three unknowns.

$$y_{A1} = \alpha_{A1} \cdot x_A + \beta_{A1} \cdot x_B + \gamma_{A1} \cdot x_C$$

$$y_{A2} = \alpha_{A2} \cdot x_A + \beta_{A2} \cdot x_B + \gamma_{A2} \cdot x_C$$

$$y_{B1} = \alpha_{B1} \cdot x_A + \beta_{B1} \cdot x_B + \gamma_{B1} \cdot x_C$$

$$y_{B2} = \alpha_{B2} \cdot x_A + \beta_{B2} \cdot x_B + \gamma_{B2} \cdot x_C$$

$$y_{C1} = \alpha_{C1} \cdot x_A + \beta_{C1} \cdot x_B + \gamma_{C1} \cdot x_C$$

$$y_{C2} = \alpha_{C2} \cdot x_A + \beta_{C2} \cdot x_B + \gamma_{C2} \cdot x_C \quad (3)$$

Figure 7:
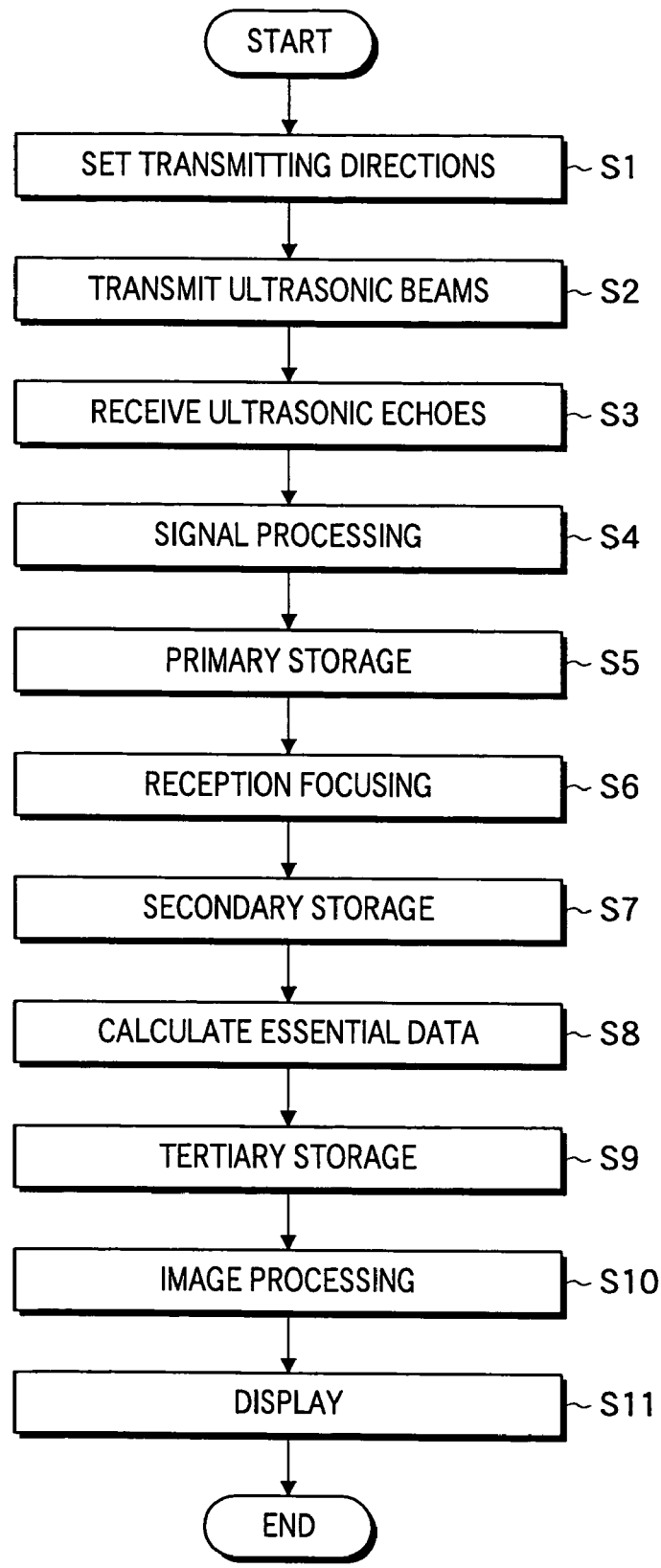
FIG. 7 is a flowchart showing an ultrasonic transmitting and receiving method according to the first embodiment of the present invention.

Next, an ultrasonic transmitting and receiving method according to the first embodiment of the present invention will be described by referring to FIGS. 1-4 and FIG. 7. FIG. 7 is a flowchart showing the transmitting and receiving method according to this embodiment.

First, at step S1, the scanning control unit 11 sets transmitting directions of ultrasonic beams. Accordingly, the transmission control unit 13 sets delay times in the drive signal generating unit 14 based on the transmission delay patterns in response to the set transmitting directions as shown in FIG. 2B, for example.

At step S2, when the drive signal generating unit 14 generates drive signals, the set number of ultrasonic beams are transmitted toward the set directions as shown in FIG. 2A, for example.

At step S3, the switch is turned in the transmission and reception switching unit 15, and the ultrasonic transducer array 10 receives ultrasonic echoes with predetermined timing. Each of the plural ultrasonic transducers included in the ultrasonic transducer array 10 generates an electrical signal (detection signal) based on the received ultrasonic echoes.

At step S4, the signal processing unit 21 performs signal processing such as logarithmic amplification, STC, filtering processing, A/D conversion on the detection signal outputted from each of the plural ultrasonic transducers. At step S5, the signal processed detection signals (digital data) are sequentially stored in the primary storage unit 22 with respect to each line.

At step S6, the reception control unit 24 performs reception focusing processing by using detection signals stored in the primary storage unit 22 based on the predetermined reception delay patterns as shown in FIG. 3B, for example. Thereby, sound ray data corresponding to the transmitting directions set by the scanning control unit 11 are formed. The sound ray data formed at step S6 is stored in the secondary storage unit 25 (step S7).

At step S8, the essential data calculating unit 32 calculates essential data in a predetermined isochronal surface by using measurement data in the predetermined isochronal surface included in the sound ray data stored in the secondary storage unit 25, and intensity profiles (for example, see FIG. 4) stored in the intensity profile storage unit 31.

The calculation of the essential data is performed as follows. The simultaneous equations described in the equations (1) to (3) can be expressed as the matrix relational expression (linear equation) as shown by the equation (4).

$$b = Ax \quad (4)$$

Where, "b" is a measurement data vector having measurement data $y_A$, $y_B$, ... as components, and "x" is an essential data vector having essential data $x_A$, $x_B$, ... as components. Further, "A" is a matrix having "m" rows and "n" columns ($m \geq n$) and acoustic pressure intensity ratios $\alpha_A$, $\alpha_B$, ... in the intensity profiles as components. Specifically, the simultaneous equations (3) are expressed as follows:

$$\begin{pmatrix} y_{A1} \\ y_{A2} \\ y_{B1} \\ y_{B2} \\ y_{C1} \\ y_{C2} \end{pmatrix} = \begin{pmatrix} \alpha_{A1} & \beta_{A1} & \gamma_{A1} \\ \alpha_{A2} & \beta_{A2} & \gamma_{A2} \\ \alpha_{B1} & \beta_{B1} & \gamma_{B1} \\ \alpha_{B2} & \beta_{B2} & \gamma_{B2} \\ \alpha_{C1} & \beta_{C1} & \gamma_{C1} \\ \alpha_{C2} & \beta_{C2} & \gamma_{C2} \end{pmatrix} \begin{pmatrix} x_A \\ x_B \\ x_C \end{pmatrix} \quad (3')$$

In the case where m=n in the equation (4), that is, the matrix "A" is a square matrix and a regular matrix, the vector "x" can be obtained by obtaining an inverse matrix $A^{-1}$, and applying it from the left side of both sides of the equation (4). In this case, as a method of obtaining the inverse matrix $A^{-1}$, for example, the exact method including the sweeping-out method (Gaussian elimination method) and the LU decomposition method using it, or the iterative method including the SOR method, etc. can be used.

In addition, in the case where m>n in the equation (4), by using the least-squares method, a plausible solution of the vector "x" can be obtained.

The essential data calculated at step S8 is stored in the tertiary storage unit 33 (step S9).

At step S10, the image processing unit 34 constructs two-dimensional or three-dimensional image data based on the calculated essential data and performs image processing such as gain adjustment and gradation processing and scanning conversion. Then, at step S11, the display unit 35 displays ultrasonic images on a display based on the image processed image data.

As described above, in this embodiment, the side lobe component is eliminated from measurement data not by suppressing the occurrence of the side lobes in the transmission beams, but by estimating the essential data based on the measurement data and the acoustic pressure intensity profiles. Therefore, in the case where ultrasonic waves are subjected to multi-beam transmission, ultrasonic images with high image quality and reduced effect of side lobes can be obtained.

Figure 8:
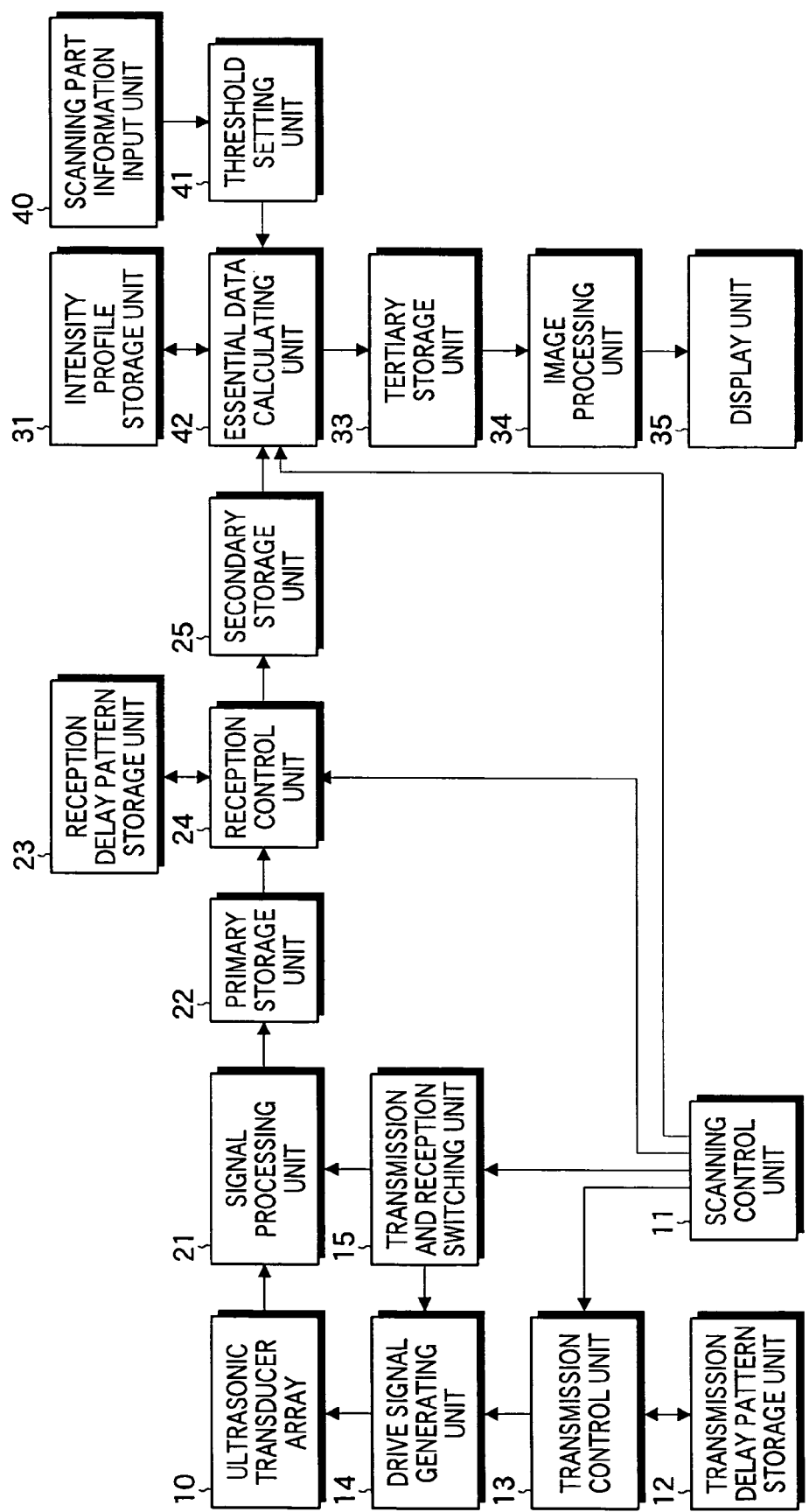
FIG. 8 is a block diagram showing an ultrasonic transmitting and receiving apparatus according to the second embodiment of the present invention.

Next, an ultrasonic transmitting and receiving apparatus according to the second embodiment of the present invention will be described by referring to FIG. 8. The ultrasonic transmitting and receiving apparatus according to this embodiment has a scanning part information input unit 40 and a threshold setting unit 41. Further, the apparatus has an essential data calculating unit 42 instead of the essential data calculating unit 32 in FIG. 1. The rest of the constitution is the same as that shown in FIG. 1.

The ultrasonic transmitting and receiving apparatus according to this embodiment uses the Moore-Penrose (MP) generalized inverse matrix when solving the simultaneous equations described in the equations (4). Simultaneously, a matrix, a rank of which is reduced by discarding singular values, may be used. The MP generalized inverse matrix will be described later in detail.

The scanning part information input unit 40 is provided on the operation panel, for example, and used when inputting a part of the object of ultrasonic imaging. The threshold setting unit 41 sets a threshold to be used when discarding singular values based on the scanning part information inputted from the scanning part information input unit 40. The threshold setting unit 41 may include a storage unit for storing plural thresholds corresponding plural parts of the object.

Figure 9:
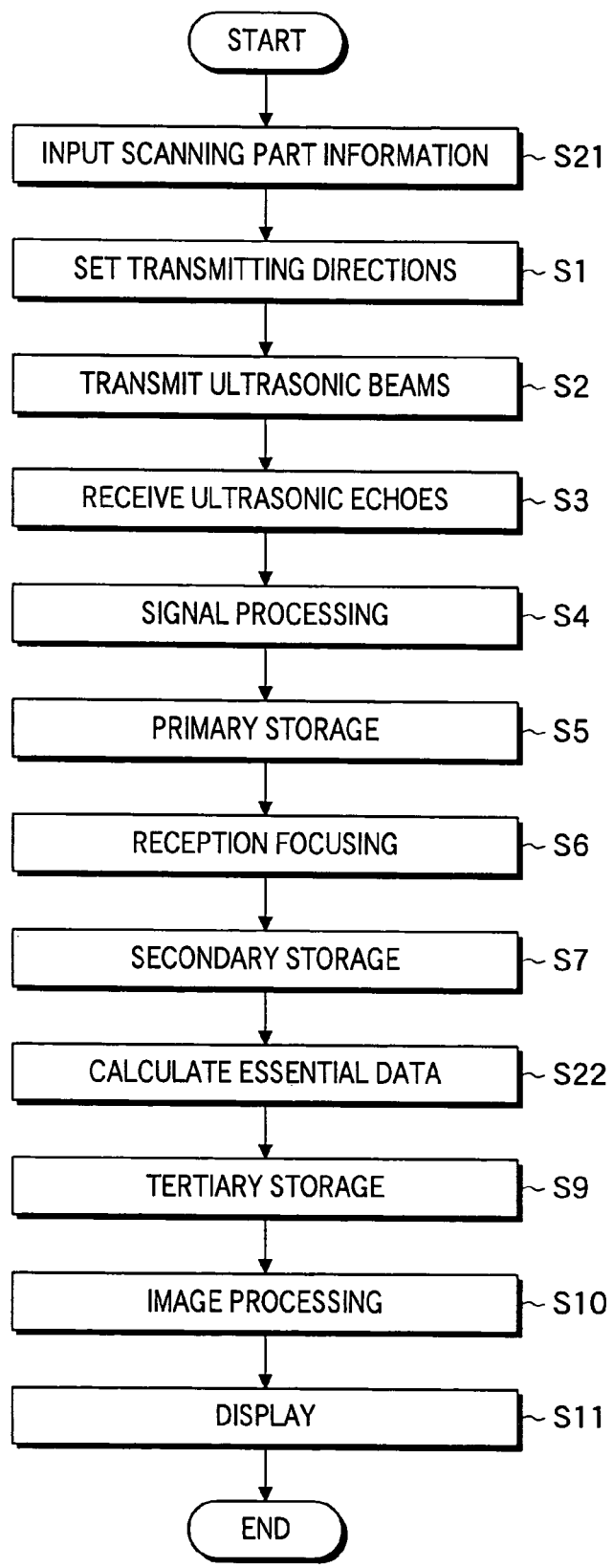
FIG. 9 is a flowchart showing an ultrasonic transmitting and receiving method according to the second embodiment of the present invention.

Next, an ultrasonic transmitting and receiving method according to the second embodiment of the present invention will be described. FIG. 9 is a flowchart showing the ultrasonic transmitting and receiving method according to this embodiment.

First, at step S21, the operator inputs scanning part information representing a part of the object of imaging by using the scanning part information input unit 40. In response to this, the threshold setting unit 41 sets a threshold to be used when discarding singular values based on the scanning part information inputted from the scanning part information input unit 40.

Then, at steps S1 to S7, transmission and reception of ultrasonic waves are performed and the measurement data on a predetermined isochronal surface is stored in the secondary storage unit 25. The operation at steps S1 to S7 is the same as described in the first embodiment of the present invention.

Then, at step S22, the essential data calculating unit 42 calculates an essential data vector by using a matrix having acoustic pressure intensity ratios $\alpha_A$, $\alpha_B$, . . . in intensity profiles as components, and a measurement data vector "b" stored in the secondary storage unit.

Here, the method of calculating essential data at step S22 will be described in detail.

In the special case where the matrix "A" is square and regular in the matrix relational expression (linear equation) shown by the equations (4), as described in the first embodiment, the equation can be solved by directly obtaining the inverse matrix $A^{-1}$.

However, generally, the inverse matrix of the matrix "A" is not necessarily obtained uniquely. Especially, in the case where the number of equations is made larger than the number of unknowns (essential data) in order to raise the reliability of the solution as in the equations (3'), since the equations has extra conditions, the matrix "A" having acoustic pressure intensity ratios as components becomes a non-square matrix, and no inverse matrix exists.

Here, a matrix "G" that satisfies AGA=A for the matrix "A" of m×n form is referred to as "generalized inverse matrix". The generalized inverse matrix "G" gives least-squares solution to the essential data vector "x" of the equation (4). However, the solution given by the generalized inverse matrix "G" is a general solution, and not determined uniquely.

Accordingly, the following three conditions are given to the generalized inverse matrix "G" in addition to the condition of the generalized inverse matrix AGA=A.

$$GAG=G \quad (5)$$

$$(GA)_T=GA \quad (6)$$

$$(AG)^T=AG \quad (7)$$

Where the matrix $X^T$ represents a transposed matrix of the matrix "X".

The matrix "G" that satisfies all of these conditions (5) to (7) are referred to as "Moore-Penrose generalized inverse matrix", and represented by $A^+$. The MP generalized inverse matrix $A^+$ is for uniquely determining generalized inverse matrix by using the condition that the norm of the vector "x" is minimum in the case where the least-square solution of the matrix "A" is indefinite. That is, by using the MP generalized inverse matrix, a plausible solution of simultaneous equations can be obtained.

The MP generalized inverse matrix $A^+$ can be obtained by the singular value decomposition (SVD) method. First, the m×n form matrix "A" is doubly diagonalized by the Householder transformation, and further diagonalized by the QR method to obtain r eigen values of $\lambda_1, \lambda_2, \ldots, \lambda_r$. Thereby, the singular value $\sigma_i = \sqrt{\lambda_i}$ is obtained. The r-th order diagonal matrix having this $\sigma_i$ as diagonal element is assumed as $\Sigma$. Further, the m×r matrix or the n×r matrix formed by sequentially aligning normalized eigen vectors of corresponding symmetric matrix $AA^T$ and $A^TA$ are represented as "U", "V", respectively. By using these, the matrix "A" is decomposed as the equation (8).

$$A=U\Sigma V^T \qquad (8)$$

Here, the MP generalized inverse matrix $A^+$ is expressed by the following equation (9).

$$A^+=V\Sigma^+U^T \qquad (9)$$

Where $\Sigma^+$ is a n×m diagonal matrix, and, assuming that the diagonal element of $\Sigma$ is $\sigma_i$, the diagonal element $\sigma_i^+$ of $\Sigma^+$ is represented as follows.

$$\sigma_i^+=1/\sigma_i(\sigma_i\neq 0)$$

$$\sigma_i^+=0(\sigma_i=0)$$

From the equations (4) and (9), the essential data vector x is obtained by the equation (10).

$$x=A^+b=V\Sigma^+U^Tb \qquad (10)$$

In the actual calculation, it is desired that the rank of the matrix A is reduced, and the MP generalized inverse matrix is obtained by using the compressed matrix $A_Q$, for relaxation of unstable conditions in simultaneous equations, that is, for suppressing the noise included in terms.

Next, relaxation of unstable conditions in simultaneous equations will be described in detail.

It is assumed that a vector with true measurement data including no error as components is $b_0$, a vector having true essential data as components is $x_0$, and a real blur function including no noise is $A_0$. The true measurement data vector $b_0$ is obtained by applying blur function $A_0$ to the true essential data vector $x_0$.

$$b_0=A_0x_0 \qquad (4')$$

Correspondingly, the measurement data vector "b" and the blur function "A" in the equation (4) are expressed as follows.

$$b=b_0+k \qquad (11)$$

$$A=A_0+\delta A \qquad (12)$$

Where "k" is a vector having measurement data error as components. Further, $\delta A$ is error of a blur function, and $A_0$ is a real blur function.

Using equations (4), (4'), (11), (12), the measurement data "b" is expressed by the equation (13).

$$b = b_0 + k = A_0x_0 + k \qquad (13)$$
$$= (A - \delta A)x_0 + k$$
$$= Ax_0 - \delta Ax_0 + k$$
$$b = Ax_0 + \varepsilon$$

where $\varepsilon$ is equivalent noise, and expressed as $\varepsilon=-\delta Ax_0+k$.

As described above, the linear inverse problem for obtaining an original image from a blurred image is substituted with the estimation of the real essential data vector $x_0$ from the measurement data vector "b".

Here, the MP generalized inverse matrix $A^+$ is applied to both sides of the equation (13).

$$x=A^+b=A^+Ax_0+A^+\varepsilon \qquad (14)$$

As clearly seen from the equation (14), for example, in the case where, if "A" is slightly varied, "x" changes largely, that is, in the case where "A" is an adverse condition, $A^+\varepsilon$ becomes extremely larger. In such case, it is not suitable to use $x=A^+b=x_0+A^+\varepsilon$ as an estimated value. Accordingly, in order to obtain a solution with high accuracy, it is desired to reduce the rank of the matrix. It will be described later in detail that A is an adverse condition.

The singular value decomposition of the matrices "A" and $A^+$ described in the equations (8) and (9) is represented as follows.

$$A = \sum_{r=1}^{R} \kappa_r w_r v_r^T \qquad (15)$$

$$A^+ = \sum_{r=1}^{R} \kappa_r^{-1} v_r w_r^T \qquad (16)$$

Where R represents a rank of the matrix "A" (R=Rank (A)), $\kappa_1, \kappa_2, \ldots, \kappa_R$, are singular values of the matrix "A", and $\kappa_1\geq\kappa_2\geq \ldots \kappa_R>0$. In addition, $w_r$ is a normalized eigen vector of corresponding $AA^T$, $v_r$ is a normalized eigen vector of corresponding $A^TA$. Further, $\kappa_r^{-1}$ is an inverse number of the singular value.

In the equation (15), the matrix obtained by leaving larger Q values from among the singular values $\kappa_r(r=1, 2, \ldots, R)$ is assumed as a matrix $A_Q$ obtained by approximating the matrix "A" having rank "Q".

$$A_Q = \sum_{r=1}^{Q} \kappa_r w_r v_r^T \qquad (17)$$

$$A_Q^+ = \sum_{r=1}^{Q} \kappa_r^{-1} w_r v_r^T$$

Thereby, an approximated vector $X_Q$ of the real essential data can be estimated using the MP generalized inverse matrix $A_Q^+$ of the approximated matrix $A_Q$ by the equation (18).

$$x_Q=A_Q^+b \qquad (18)$$

As described above, unreliable conditions can be relaxed by reducing the rank of the matrix "A". However, there are some cases where the error is amplified depending on the degree of rank reduction. The essential data estimated vector $x_R$ estimated by the matrix "A" having the rank R which is not reduced is expressed by using the equation (13) as follows:

$$x_R = A^+b \qquad (19)$$
$$= A^+(Ax_0 + \varepsilon)$$
$$x_R = \sum_{r=1}^{R} ((x_0)_r + \kappa_r^{-1}\varepsilon_r)v_r$$

As clearly seen from the equation (19), the smaller the singular value, the more the equivalent noise is amplified. Accordingly, by reducing the rank of the matrix "A" so as to discard the smaller singular values, the approximation degree for the real value $x_0$ of the estimated value can be increased and the amplification degree of noise can be reduced.

In the case of using the vector $X_R$ obtained by the matrix "A" of rank "R" as the estimated values of the vector $x_0$ having real values of essential data as components, square estimation error $S_R$ is defined as follows by using norm $\|x_R - X_0\|$ of the differential vector between the essential data estimated vector $x_R$ and the real essential data vector $x_0$.

$$S_R = \|x_R - x_0\|^2 = \sum_{n=1}^{N}((x_R)_n - (x_0)_n)^2$$

Herein, the equation (19) is substituted. It is assumed that $1 \leq r \leq R < N$, and $n=1$ to R, R+1 to N.

$$S_R = \sum_{n=1}^{R}((x_R)_n - (x_0)_n)^2 + \sum_{n=R+1}^{N}((x_R)_n - (x_0)_n)^2$$

Where, since $1 \leq r \leq R$ in the equation (19), the vector $v_R = 0$ in the case where $r > R$. Therefore, in the second term of the above equation which is defined when $R+1 \leq n \leq N$, the vector $x_R = 0$. Thereby, the equation (20) is obtained.

$$S_R = \sum_{n=1}^{R}((x_0)_n + \kappa_n^{-1}\varepsilon_n - (x_0)_n)^2 + \sum_{n=R+1}^{N}(-(x_0)_n)^2 \quad (20)$$
$$= \sum_{r=1}^{R}(\kappa_r^{-1}\varepsilon_r)^2 + \sum_{n=R+1}^{N}(x_0)_n^2$$

The first term of the equation (20) is an error produced by mixing of noise, and can be estimated by making $\varepsilon$ substantially constant. On the other hand, it is impossible in principle to estimate the second term because the real essential data vector $x_0$ is unknown. However, it is qualitatively known that, by reducing the rank "R", the first term is reduced and the second term is increased. That is, there is the optimum rank "R" for estimating the essential data vector.

The optimum value of the rank "R" can be judged as follows. The square estimation error $S_Q$ between the solution vector (essential data approximated vector) $x_Q$ calculated by the matrix $A_Q$ having the reduced rank and the real essential data vector $x_0$ is expressed by the following equation (21).

$$S_Q = \|x_Q - x_0\|^2$$
$$= \sum_{n=1}^{Q}(\kappa_n^{-1}\varepsilon_n)^2 + \sum_{n=Q+1}^{N}(x_0)_n^2$$

Substituting the equation (20) in this equation, $$S_Q = S_R - \sum_{n=Q+1}^{R}\kappa_n^{-2}\varepsilon_n^2 + \sum_{n=Q+1}^{R}(x_0)_n^2 \quad (21)$$

From the equation (21), in the case where $S_R - S_Q$ is positive, the essential data approximated vector $x_Q$ is judged to have a superior estimated value to the original estimated vector $x_R$, that is, to have a value closer to the real essential data.

Here, in order to judge whether $S_R > S_Q$ holds on average or not, a probability density function is introduced.

$$\Delta Q = \langle S_R \rangle - \langle S_Q \rangle \quad (22)$$
$$\Delta Q = \sum_{n=Q+1}^{R}(\kappa_n^{-2}\langle \varepsilon_n \rangle^2 - \langle(x_0)_n \rangle^2)$$

Where $\langle \bullet \rangle$ represents a probability density function. Assuming that the probability density function is represented by $f(n) = \langle \bullet \rangle$, the probability density function has the following character.

$$\sum_{n=1}^{\infty} f(n) = 1$$

In the equation (22), it may be judged that the essential data approximated vector $x_Q$ is a superior estimated value to the original estimated vector $X_R$ in the case where $\Delta Q > 0$. In the equation (22), the probability density functions of the equivalent noise and the essential data vector are used. In the case of rigorously evaluating $\Delta Q$, it is desired that these probability density functions have been obtained.

On the other hand, a problem that calculated amounts become larger arises for obtaining the probability density functions for evaluating $\Delta Q$. Accordingly, in the actual calculation, it is desired that an appropriate rank "Q" is set by judging whether the solution is good or not while adjusting the threshold for discarding the singular values. Since this threshold is determined at some degree depending on the part as an object of ultrasonic imaging and transmission and reception conditions of ultrasonic waves, the threshold setting unit 41 may be arranged to set the threshold based on the scanning part information inputted from the scanning part information input unit 40 as shown in FIG. 8.

As described above, by using the MP generalized inverse matrix, the linear equations (4) can be solved regardless of the condition of the matrix "A".

Referring to FIG. 9 again, in the ultrasonic transmitting and receiving apparatus, at steps S9 to S11, the processing for displaying ultrasonic images is performed based on the essential data that has been calculated at step S22. The operation at steps S9 to S11 is the same as that described in the first embodiment of the present invention.

By the way, even when the matrix "A" is square and regular, the essential data estimation may be performed by using the MP generalized inverse matrix. The reason for this is that, in the exact method, the following problems are pointed out in the lecture on the wave theory ("Wave Theory II" lecture handout, "(9) Solving Method of Simultaneous Equations", searched on Mar. 14, 2003, via the Internet, <URL: http://www.mobile.ss.titech.ac.jp/~takada/hadou/>) by Junichi Takada (Department of Electrical and Electronic Engineering, Graduate School of Science and Engineering, Tokyo Institute of Technology).

In the case where "b" includes error $\Delta b$ in the linear equation $Ax=b$, the variation $\Delta x$ of the solution "x" is given by the following equations.

$$A(x+\Delta x) = b + \Delta b$$

$$A\Delta x = \Delta b \quad (23)$$

Simultaneously, the following relation holds.

$$\|A\|\,\|\Delta x\| \geqq \|\Delta b\|$$

$$\|A^{-1}\|\,\|b\| \geqq \|x\|$$

Where $\|\bullet\|$ represents a norm. Therefore, the following relationship holds between the relative error of "b" and the relative error of "x".

$$\|\Delta x\|/\|x\| \leqq \|A\|\,\|A^{-1}\|\,\|\Delta b\|/\|b\|$$

In addition, in the case where there is error $\Delta A$ in the matrix "A", the variation of the solution is given by the following equation by using the equation (23).

$$(A+\Delta A)(x+\Delta x)=b$$

$$\Delta A(x+\Delta x)+A\Delta x=0$$

Simultaneously, the following relationship holds.

$$\|A^{-1}\|\,\|\Delta A\|\,\|x+\Delta x\| \geqq \|\Delta x\|$$

Therefore, the following relationship holds between the relative error of "A" and the relative error of "x".

$$\|\Delta x\|/\|x+\Delta x\| \leqq \|A\|\,\|A^{-1}\|\,\|\Delta A\|/\|A\|$$

Here, assuming that a number of conditions regarding "A" is represented by cond (A)=$\|A\|\,\|A^{-1}\|$, the relative error of "x" becomes cond (A) times larger at the maximum when error occurs in both "A" and "b". By the way, the number of conditions can also be expressed by the ratio of the maximum singular value ($\kappa_{max}$) and the minimum singular value ($\kappa_{min}$) when singular value decomposition is performed on the matrix "A". That is, cond(A)=$\kappa_{max}/\kappa_{min}$.

The matrix A is defined as an adverse condition when the number of condition cond (A) is large. In such case, Takada described that, when obtaining the solution vector x, the minimum norm solution should be obtained by not using the exact method, but using the singular value decomposition. That is, in the ultrasonic transmitting and receiving method according to this embodiment, it is also desired that the resolution is obtained by using the MP generalized inverse matrix when the matrix "A" is an adverse condition.

Next, an ultrasonic transmitting and receiving method according to the third embodiment of the present invention will be described by referring to FIGS. 10A and 10B. The ultrasonic transmitting and receiving method according to this embodiment can be used in both of the ultrasonic transmitting and receiving apparatuses as shown in FIGS. 1 and 8.

Figure 10A:
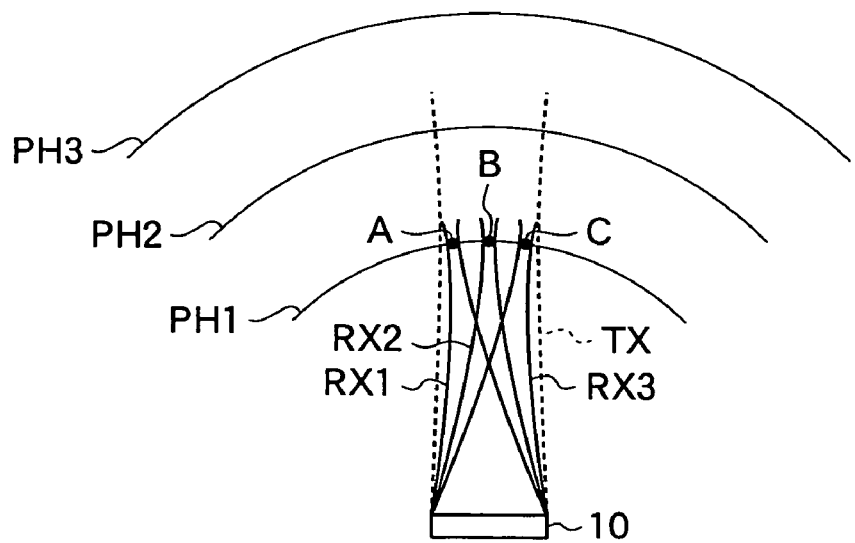
FIGS. 10A and 10B are diagrams for explanation of an ultrasonic transmitting and receiving method according to the third embodiment of the present invention.
Figure 10B:
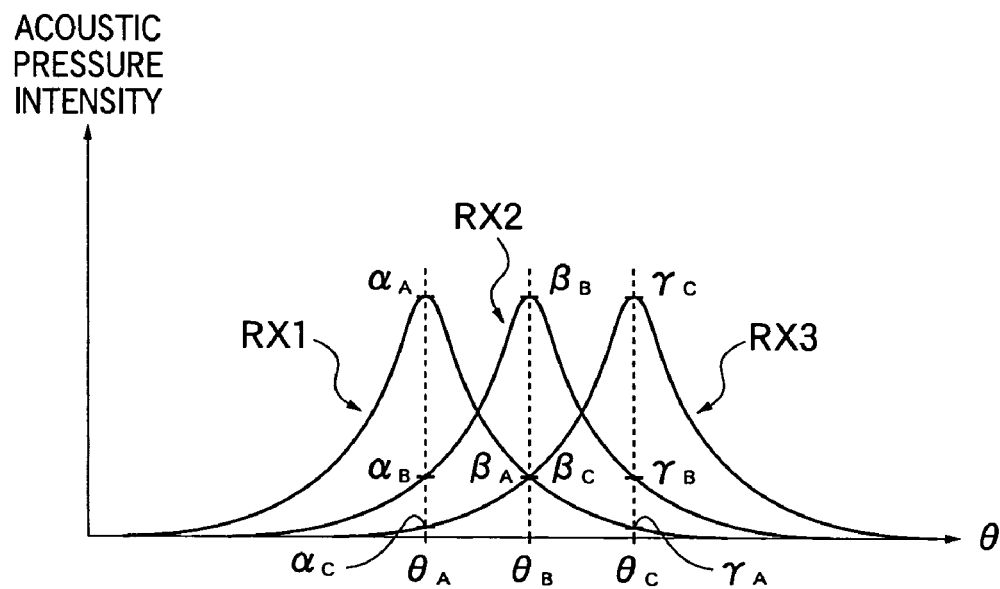

As shown in FIG. 10A, in the ultrasonic transmitting and receiving method according to this embodiment, an ultrasonic beam TX is transmitted toward single direction, and reception focusing processing is performed with respect to the detection signals of the received ultrasonic echoes so as to form three reception focal points A, B, C. Thereby, measurement data $y_A$, $y_B$, $y_C$ in three regions can be acquired. In addition, as shown in FIG. 10B, by the transmission beam TX and reception beams RX1, RX2, RX3, three different intensity profiles with ($\alpha_A$, $\beta_A$, $\gamma_A$), ($\alpha_B$, $\beta_B$, $\gamma_B$), ($\alpha_C$, $\beta_C$, $\gamma_C$) as components, respectively, are set.

Accordingly, the simultaneous equations (26) are obtained. Where, $x_A$, $x_B$, $x_C$ represent the essential data (estimated data) in regions A, B, C.

$$y_A=\alpha_A\cdot x_A+\beta_A\cdot x_B+\gamma_A\cdot x_C$$

$$y_B=\alpha_B\cdot x_A+\beta_B\cdot x_B+\gamma_B\cdot x_C$$

$$y_C=\alpha_C\cdot x_A+\beta_C\cdot x_B+\gamma_C\cdot x_C \qquad (26)$$

By solving the simultaneous equations (26), the essential data $x_A$, $x_B$, $x_C$ can be calculated. The calculating method of the essential data is the same as that described in the first or second embodiment of the present invention. By the way, as described by referring to FIG. 6, the number of equations constituting the simultaneous equations may be increased in order to raise the estimation accuracy of the essential data.

According to this embodiment, since only single ultrasonic beam is transmitted at a time, the effect of the side lobes when performing beam transmission can be reduced, and the side lobe component included in the ultrasonic echo signals can be reduced by the calculation of the essential data. In addition, plural reception focal points are formed with respect to the received ultrasonic echoes, the image data representing plural parts within the object can be acquired at high speed with less number of transmission and reception of ultrasonic waves.

An ultrasonic transmitting and receiving method according to the fourth embodiment of the present invention will be described by referring to FIGS. 11A and 11B. The ultrasonic transmitting and receiving method according to this embodiment can be used in both of the ultrasonic transmitting and receiving apparatuses as shown in FIGS. 1 and 8.

Figure 11A:
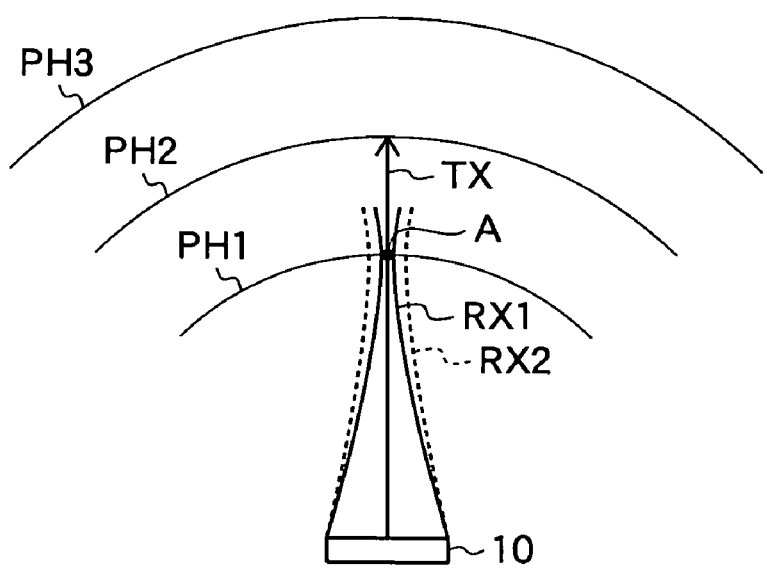
FIGS. 11A and 11B are diagrams for explanation of an ultrasonic transmitting and receiving method according to the fourth embodiment of the present invention.
Figure 11B:
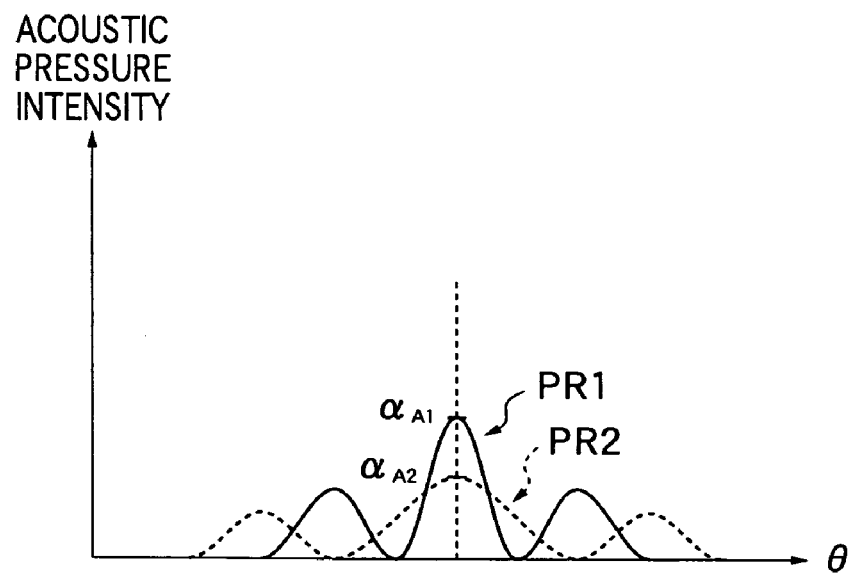

As shown in FIG. 11A, in the ultrasonic transmitting and receiving method according to this embodiment, an ultrasonic beam TX is transmitted toward a single direction, and reception focusing processing is performed with respect to the received ultrasonic echo signals by using different reception delay patterns RX1 and RX2, and thereby, plural pieces of measurement data $y_{A1}$ and $y_{A2}$ relating to the region A are acquired. In addition, as shown in FIG. 11B, by varying the reception delay pattern, intensity profiles PR1 and PR2 corresponding to the different measurement data $y_{A1}$ and $y_{A2}$ are set. In order to set the different intensity profiles, the aperture condition of the ultrasonic transducer array 10 when transmitting ultrasonic beams and the transmission condition including the transmission delay pattern may be varied other than varying the reception condition including reception focusing processing.

According to the method, the simultaneous equations (27) are obtained. Where, "x" represents the essential data (estimated data) in the region "A".

$$y_{A1}=\alpha_{A1}\cdot x$$

$$y_{A2}=\alpha_{A2}\cdot x \qquad (26)$$

By solving the simultaneous equations (27), the essential data "x" can be calculated. Here, since the simultaneous equations (27) have a larger number of equations than a number of unknowns "x", the equations have extra conditions. On this account, when solving the simultaneous equations (27), a plausible solution is obtained. The calculating method of the essential data is the same as that described in the first or second embodiment of the present invention.

According to this embodiment, since the essential data relating to the predetermined region is calculated by using plural different intensity profiles and plural pieces of measurement data, the estimation accuracy of the essential data can be raised.

Next, an ultrasonic transmitting and receiving method according to the fifth embodiment of the present invention will be described by referring to FIGS. 5A and 5B. The ultrasonic transmitting and receiving method according to this embodiment can be used in both of the ultrasonic transmitting and receiving apparatuses as shown in FIGS. 1 and 8.

As shown in FIG. 5A, the first multi-beam transmission is performed toward TA, TB, TC directions, and reception focusing processing is performed with respect to the detection signals of the received ultrasonic echoes so as to form reception focal points on the isochronal surface PH1 in TA, TB, TC, TD, TE directions. By using thus obtained measurement data $y_{A1}, y_{B1}, y_{C1}, y_{D1}, y_{E1}$ and intensity profiles corresponding to the respective measurement data as shown in FIG. 5B, the essential data $x_{A1}, x_{B1}, x_{C1}, x_{D1}, x_{E1}$ in the regions A, B, C, D, E are calculated. The calculating method of the essential data is the same as that described in the first or second embodiment of the present invention.

Then, the second multi-beam transmission is performed toward directions including TD, TE, and reception focusing processing is performed with respect to the detection signals of the received ultrasonic echoes so as to form reception focal points on the isochronal surface PH1 in TA, TB, TC, TD, TE directions. By using thus obtained measurement data $y_{A2}, y_{B2}, y_{C2}, y_{D2}, y_{E2}$ and intensity profiles corresponding to the respective measurement data, the essential data $x_{A2}, x_{B2}, x_{C2}, x_{D2}, x_{E2}$ in the regions A, B, C, D, E are calculated.

Subsequently, an average or an arithmetic mean is obtained between the essential data $x_{A2}, x_{B2}, x_{C2}, x_{D2}, x_{E2}$ calculated by performing the first multi-beam transmission and the essential data $x_{A2}, x_{B2}, x_{C2}, x_{D2}, x_{E2}$ calculated by performing the second multi-beam transmission, thereby the essential data $x_A, x_B, x_C, x_D, x_E$ are calculated.

As described above, by performing the multi-beam transmission and reception of ultrasonic waves under different conditions, and averaging the essential data calculated under the respective conditions, the measurement error can be reduced, and thereby, the essential data with high estimation accuracy can be obtained at high speed.

By the way, ultrasonic beams may be transmitted and received over plural times without changing the plural directions in which multi-beam transmission is performed, so that plural kinds of essential data is calculated with respect to each of the predetermined regions A, B, C, D, E, and averaged. By such method, the measurement error can also be reduced.

Figure 12:
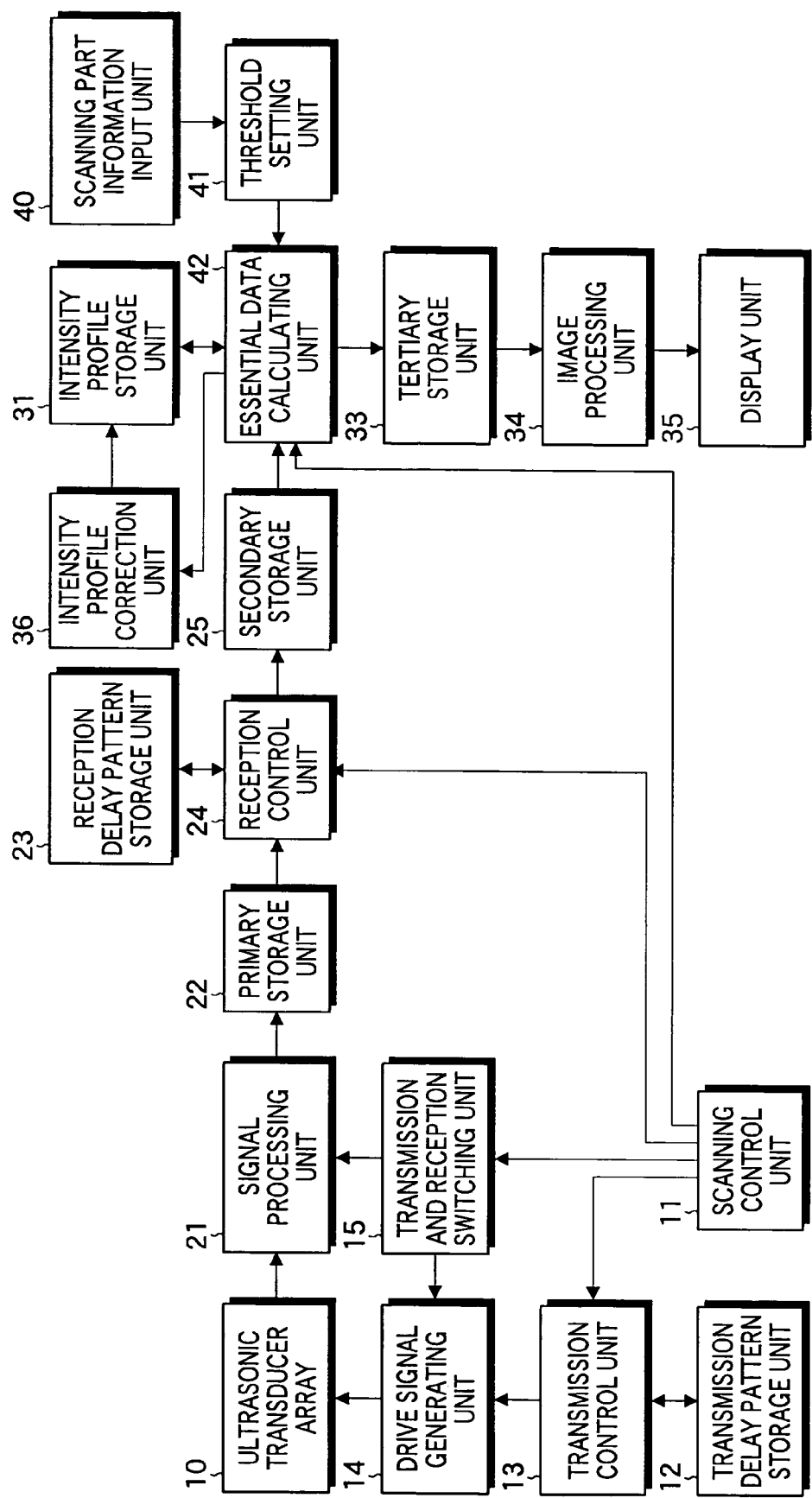
FIG. 12 is a block diagram showing a modified example of the ultrasonic transmitting and receiving apparatus shown in FIG. 8.

Next, a modified example of the ultrasonic transmitting and receiving methods according to the first to fifth embodiments of the present invention will be described by referring to FIG. 1 and FIGS. 12 to 14. FIG. 12 is a block diagram showing the constitution of the ultrasonic transmitting and receiving apparatus in which the modified example of the ultrasonic transmitting and receiving methods according to the first to fifth embodiments are used. This ultrasonic transmitting and receiving apparatus is formed by adding an intensity profile correction unit 36 to the ultrasonic transmitting and receiving apparatus as shown in FIG. 8. The rest of the constitution is the same as that of the ultrasonic transmitting and receiving apparatus as shown in FIG. 8.

As described in the first embodiment of the present invention, in order to estimate the essential data "x", measurement data and intensity profiles in the regions defined by the transmitting and receiving directions of ultrasonic beams and isochronal surfaces are used. Therefore, strictly, in order to estimate the essential data relating to all of the regions within the object, intensity profiles corresponding to both all directions TA, TB, . . . and all isochronal surfaces PH1, PH2, . . . are required.

Here, ultrasonic waves are scattered by the relative action with the reflector in the transmission paths, and attenuated. Accordingly, the intensity profile is thought to change subtly depending on the time (depth). Therefore, in the modified example, the intensity profile on the arbitrary time surface is corrected while considering the attenuation of ultrasonic waves, and the estimation of the essential data is performed by using the corrected profile.

Figure 13:
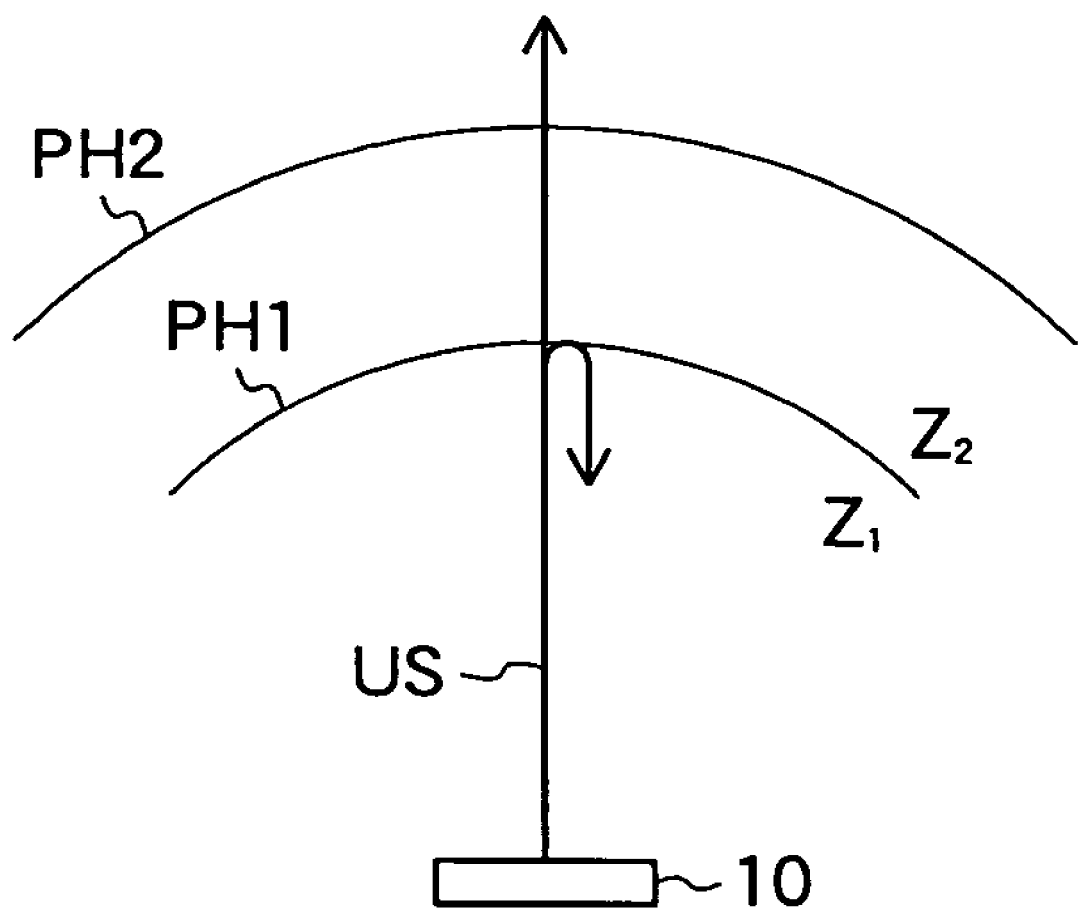
FIG. 13 is a diagram for explanation of a modified example of the ultrasonic transmitting and receiving methods in the first to fifth embodiments of the present invention.

FIG. 13 schematically shows the state of ultrasonic beam in the region in which the medium within the object changes. As shown in FIG. 13, the acoustic characteristic impedance of the medium changes from $z_1$ to $z_2$ on the isochronal surface PH1. A part of the ultrasonic beam US propagating the medium within the object is reflected from the isochronal surface PH1, and the other part is transmitted through the isochronal surface PH1.

The degree of attenuation of an ultrasonic beam can be estimated from the intensity of the received ultrasonic echo signal. For example, when the ultrasonic echo reflected by a certain boundary is large, the amount of ultrasonic beam transmitted through the boundary is small, and the ultrasonic beam is estimated as being largely attenuated afterwards. In the case where an ultrasonic wave is transmitted through the boundary from the medium having acoustic characteristic impedance $z_1$ toward the medium having acoustic characteristic impedance $z_2$, the relationship between the reflection coefficient R and the transmission coefficient T of ultrasonic wave intensity is expressed by the equations (28) and (29).

$$R = 10 \cdot \log|(z_2 - z_1)/(z_2 - z_1)| \tag{28}$$

$$T = 1 - R \tag{29}$$

Accordingly, based on the intensity of the ultrasonic echo signal of the measurement data on a certain isochronal surface and the intensity profile on the isochronal surface, the intensity profile on the next isochronal surface can be estimated.

Figure 14:
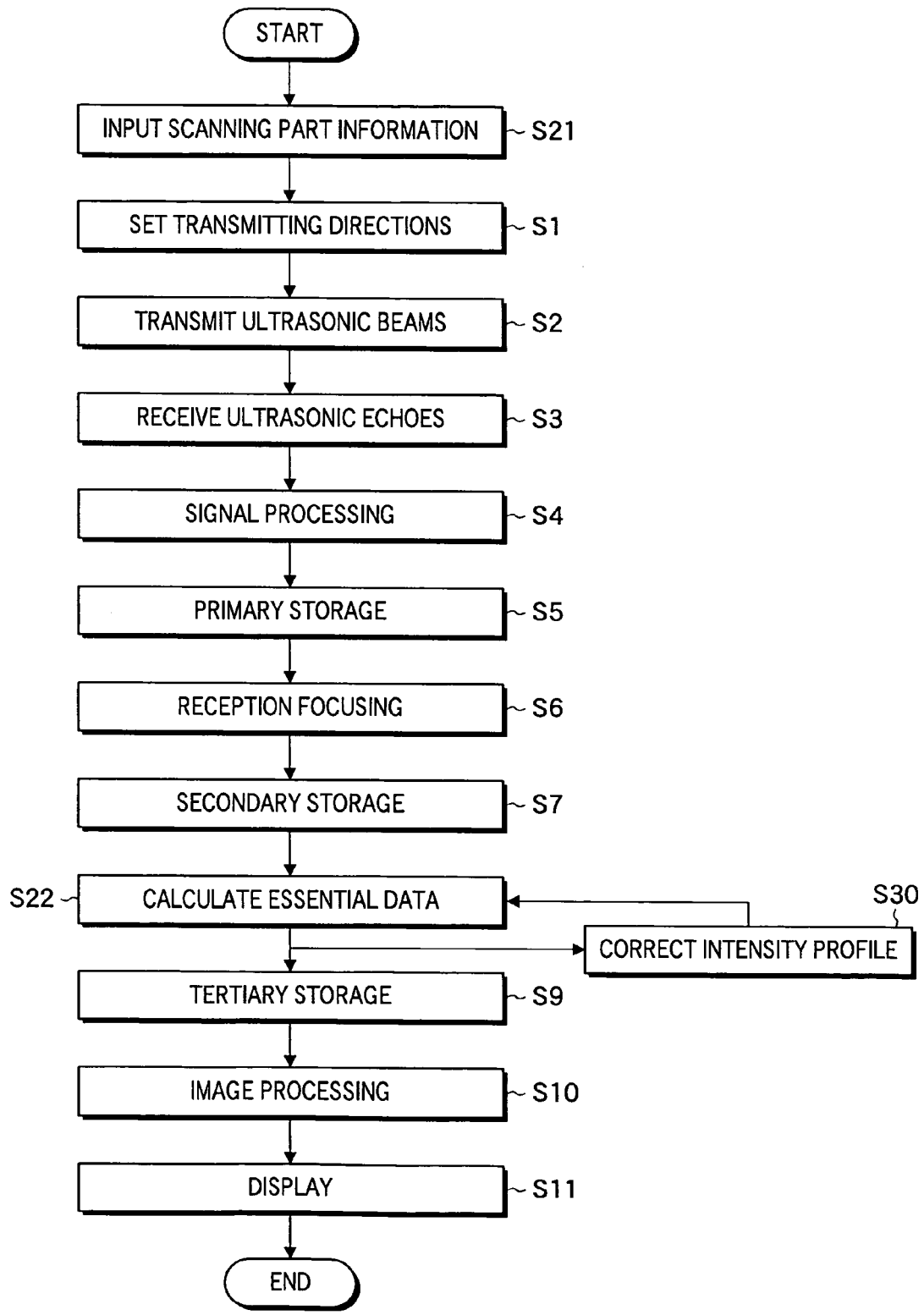
FIG. 14 is a flowchart showing the modified example of the ultrasonic transmitting and receiving methods in the first to fifth embodiments of the present invention.
Figure 15A:
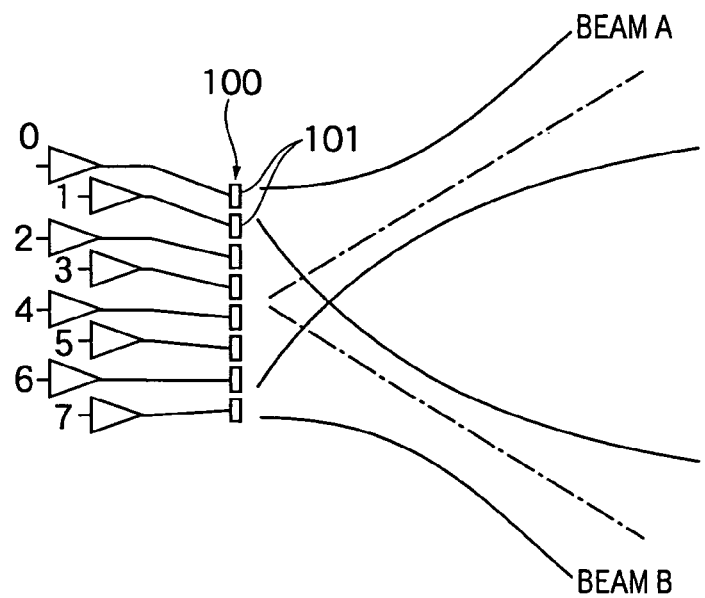
FIG. 15A is a diagram showing a state in which ultrasonic beams are transmitted from an ultrasonic transducer array included in a conventional ultrasonic probe.
Figure 15B:
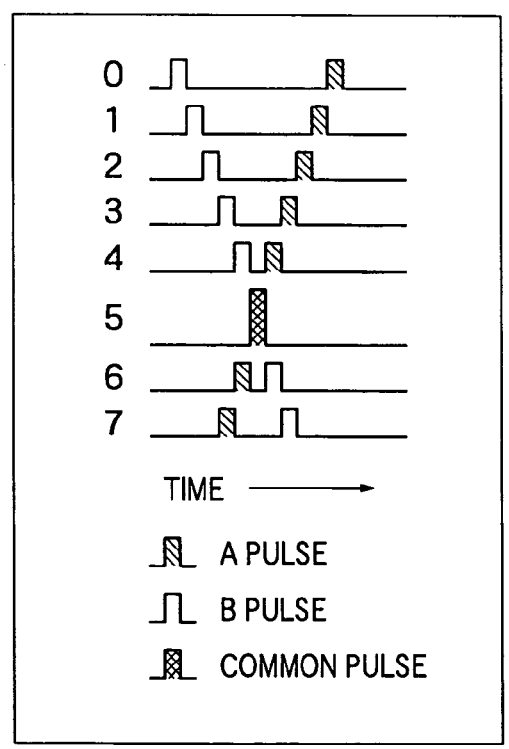
FIG. 15B shows timing pulses applied to the respective ultrasonic transducers.

FIG. 14 is a flowchart for explanation of the correction operation of the intensity profile in the modified example. As shown in FIG. 14, the ultrasonic transmitting and receiving apparatus acquires measurement data by transmitting and receiving ultrasonic beams at steps S1 to S7, and calculates essential data based on the measurement data and the intensity profile at step S22.

At step S30, the intensity profile correction unit 36 estimates the transmission coefficient "T" by assuming that the intensity of the essential data in the isochronal surface obtained immediately before at step S22 is proportional to the reflection coefficient "R", and corrects the intensity profiles to be used afterwards based on the transmission coefficient "T" in the respective regions on the isochronal surface PH2. The corrected intensity profiles are used for the essential data calculation in the isochronal surface PH2 at step S22. Alternatively, at step S30, the intensity of the measurement data may be used instead of the essential data. In this case, the calculation of the essential data at step S22 and the correction of the intensity profiles at step S30 can be performed in parallel. Further, at steps S9 to S11, the processing for displaying the ultrasonic image based on the calculated essential data is performed. The operation at steps S9 to S11 is the same as described in the first or second embodiment of the present invention.

As described above, by performing correction on the preset intensity profiles as the need arises, precise essential data can be acquired with respect to each region included within the object.

Such intensity profile correction is effective in the case where there is a strong reflector within the object. However, actually, in many regions where acoustic characteristic impedance of the medium changes, the reflection coefficient is very small, and most of ultrasonic waves can be assumed to be transmitted. Accordingly, the same intensity profile may always be used for the same direction. Alternatively, intensity profile correction may be performed only in the case where there is a strong reflector within the object. In this case, the threshold value of the reflection coefficient required for intensity profile correction may be set in the intensity profile correction unit 36.

In the above described embodiments, the case of using a two-dimensional transducer array in which plural ultrasonic transducers are arranged in a matrix form has been described. However, in the case where various ultrasonic transducer arrays such as a linear array in which plural ultrasonic transducers are arranged one-dimensionally, a convex array, a concave array, an annular array in which they are arranged coaxially, ultrasonic image data with high accuracy can also be similarly obtained by obtaining intensity profiles corresponding to the respective arrays.

As described above, according to the present invention, when the image data relating to the regions included in the object is obtained, since the essential data is calculated based on the measurement data obtained by receiving ultrasonic echoes and the profiles as to acoustic pressure intensity formed within the object, ultrasonic images with high image quality and reduced effect of side lobes can be acquired.

The invention claimed is:

1. An ultrasonic transmitting and receiving apparatus comprising:
an ultrasonic transducer array including plural ultrasonic transducers for transmitting ultrasonic waves and receiving ultrasonic echoes reflected from an object to be inspected;
drive signal generating means for generating drive signals for respectively driving said plural ultrasonic transducers;
transmission control means for controlling said drive signal generating means such that ultrasonic waves transmitted from said plural ultrasonic transducers form at least one ultrasonic beam;
signal processing means for performing reception focusing processing on plural detection signals obtained based on the ultrasonic echoes received by said plural ultrasonic transducers so as to form a reception focal point in at least one region within the object thereby obtaining plural detection signals relating to said at least one region;
storage means for storing plural different acoustic pressure intensity profiles, each of said plural different acoustic pressure intensity profiles representing one of acoustic pressure intensity and acoustic pressure intensity ratios in plural regions included in an isochronal surface as a surface where ultrasonic beams reach in predetermined time elapsed from being transmitted; and
a calculating unit configured for calculating image data relating to said at least one region on the basis of the plural detection signals relating to said at least one region and selected at least one of said plural different acoustic pressure intensity profiles.

2. An ultrasonic transmitting and receiving apparatus according to claim 1,
wherein said plural different acoustic pressure intensity profiles are previously set based on acoustic pressure intensity distribution formed by transmitting ultrasonic beams in plural different directions and the reception focusing processing to be performed in said signal processing means.

3. An ultrasonic transmitting and receiving apparatus according to claim 1,
wherein said transmission control means controls said drive signal generating means such that plural ultrasonic beams are transmitted simultaneously in plural directions.

4. An ultrasonic transmitting and receiving apparatus according to claim 1, wherein said signal processing means obtains plural detection signals relating to plural regions within the object, respectively; and
said calculating unit calculates image data relating to said plural regions by using said plural detection signals and plural acoustic pressure intensity profiles relating to said plural regions.

5. An ultrasonic transmitting and receiving apparatus according to claim 3, wherein said signal processing means obtains plural detection signals relating to plural regions within the object, respectively; and
said calculating unit calculates image data relating to said plural regions by using said plural detection signals and plural acoustic pressure intensity profiles relating to said plural regions.

6. An ultrasonic transmitting and receiving apparatus according to claim 1, wherein said signal processing means obtains plural detection signals relating to one region within the object; and
said calculating unit calculates image data relating to said one region by using said plural detection signals and plural different acoustic pressure intensity profiles relating to said one region.

7. An ultrasonic transmitting and receiving apparatus according to claim 1, wherein said signal processing means obtains plural detection signals relating to each of plural regions within the object; and
said calculating unit calculates image data relating to said plural regions by using said plural detection signals and plural different acoustic pressure intensity profiles relating to each of said plural regions.

8. An ultrasonic transmitting and receiving apparatus according to claim 3, wherein said signal processing means obtains plural detection signals relating to each of the plural regions within the object; and
said calculating unit calculates image data relating to said plural regions by using said plural detection signals and plural different acoustic pressure intensity profiles relating to each of said plural regions.

9. An ultrasonic transmitting and receiving apparatus according to claim 1, wherein said calculating unit calculates the image data by obtaining a solution of simultaneous equations which have image data relating to said at least one region as unknown and which are constructed based on the plural detection signals relating to said at least one region and plural acoustic pressure intensity profiles relating to said at least one region.

10. An ultrasonic transmitting and receiving apparatus according to claim 3, wherein said calculating unit calculates the image data by obtaining a solution of simultaneous equations which have components corresponding to image data relating to said at least one region as unknowns and which are constructed based on the plural detection signals relating to said at least one region and plural acoustic pressure intensity profiles relating to said at least one region.

11. An ultrasonic transmitting and receiving apparatus according to claim 9, wherein said calculating unit calculates the image data by obtaining vector "x" from an equation $Ax=b$ where "b" represents a vector having components corresponding to the plural detection signals relating to said at least one region, "A" represents a matrix having components corresponding to plural acoustic pressure intensity ratios in plural acoustic pressure intensity profiles relating to said at least one region, and "x" represents a vector having components corresponding to image data relating to said at least one region.

12. An ultrasonic transmitting and receiving apparatus according to claim 11, wherein said calculating unit obtains the vector "x" by obtaining a generalized inverse matrix of the matrix "A" which satisfies the equation Ax=b.

13. An ultrasonic transmitting and receiving apparatus according to claim 12, wherein said calculating means obtains the vector "x" by performing singular value decomposition on the matrix "A", reducing a rank of the matrix "A" by discarding singular values less than a predetermined value, and obtaining a generalized inverse matrix of the matrix A' which has a reduced rank.

14. An ultrasonic transmitting and receiving apparatus according to claim 11, wherein said calculating unit obtains a least square solution of the vector "x" which satisfies the equation Ax=b in the case where the matrix "A" have "in" rows and "n" columns where m>n.

15. An ultrasonic transmitting and receiving apparatus according to claim 11, wherein said calculating unit obtains the vector "x" by obtaining an inverse matrix $A^{-1}$ of the matrix "A" in accordance with one of (i) an exact method including a sweeping-out method and (ii) an iterative method in the case where the matrix "A" is a square matrix and a regular matrix.

16. An ultrasonic transmitting and receiving apparatus according to claim 2, further comprising correction means for correcting acoustic pressure intensity profiles corresponding to a second isochronal surface based on detection signals relating to a predetermined region and acoustic pressure intensity profiles corresponding to a first isochronal surface.

17. A method of transmitting and receiving ultrasonic waves by using an ultrasonic transducer array including plural ultrasonic transducers for transmitting ultrasonic waves and receiving ultrasonic echoes reflected from an object to be inspected, said method comprising the steps of:
   (a) transmitting at least one ultrasonic beam by driving said plural ultrasonic transducers;
   (b) performing reception focusing processing on plural detection signals obtained based on the ultrasonic echoes received by said plural ultrasonic transducers so as to form a reception focal point in at least one region within the object thereby obtaining plural detection signals relating to said at least one region; and
   (c) calculating image data relating to said at least one region on the basis of the plural detection signals relating to said at least one region and selected at least one of plural different acoustic pressure intensity profiles, each of said plural different acoustic pressure intensity profiles representing one of acoustic pressure intensity and acoustic pressure intensity ratios in plural regions included in an isochronal surface as a surface where ultrasonic beams reach in predetermined time elapsed form being transmitted.

* * * * *